US011328550B2

(12) United States Patent
Nireki

(10) Patent No.: US 11,328,550 B2
(45) Date of Patent: May 10, 2022

(54) PAPER SHEET PROCESSING DEVICE

(71) Applicant: UNIVERSAL ENTERTAINMENT CORPORATION, Tokyo (JP)

(72) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 15/296,011

(22) Filed: Oct. 17, 2016

(65) Prior Publication Data

US 2017/0029233 A1    Feb. 2, 2017

Related U.S. Application Data

(63) Continuation of application No. 12/809,476, filed as application No. PCT/JP2008/073014 on Dec. 17, 2008, now Pat. No. 9,505,582.

(30) Foreign Application Priority Data

Dec. 20, 2007    (JP) .............................. JP2007-328144

(51) Int. Cl.
  *G07D 11/30*    (2019.01)
  *G07D 11/13*    (2019.01)
  (Continued)

(52) U.S. Cl.
  CPC .............. *G07D 11/30* (2019.01); *B65H 29/14* (2013.01); *B65H 29/46* (2013.01); *B65H 31/00* (2013.01);
  (Continued)

(58) Field of Classification Search
  CPC ...... G07F 7/069; G07F 7/0609; G07F 7/0636; G07F 11/62; G07F 7/0627; G07F 7/04; G07F 1/06; G07F 7/0618; G07F 17/14; G07F 7/02; G07F 7/00; G07F 7/08; G07F 19/20; G07F 17/18; G07F 7/0012; G07F 7/0078; G07F 9/10; B65H 2701/1912;
  (Continued)

(56) References Cited

U.S. PATENT DOCUMENTS 4,816,652 A * 3/1989 Wildgoose ............. G07D 11/13
                                                      235/379
5,405,131 A * 4/1995 Zouzoulas ............. B65H 29/46
                                                      271/181
(Continued)

FOREIGN PATENT DOCUMENTS

JP              214172         1/1990
JP           11-296724        10/1999
(Continued)

*Primary Examiner* — Jeffrey A Shapiro
(74) *Attorney, Agent, or Firm* — Simpson & Simpson, PLLC; S. Peter Konzel

(57) ABSTRACT

A bill processing apparatus which is capable of reliably supplying information on a bill to the bill housing body side. The paper sheet processing apparatus has a bill housing part being capable of housing a bill inserted from a bill insertion slot, and also a reader/writer which wirelessly transmits information on the bill inserted from the bill insertion slot. The bill housing part has a coil antenna which wirelessly receives the information transmitted from the reader/writer, and a storage part which stores the information on the bill received from the coil antenna.

16 Claims, 21 Drawing Sheets

(51) Int. Cl.
| | | |
|---|---|---|
| *G07D 11/28* | (2019.01) | |
| *G07D 11/50* | (2019.01) | |
| *B65H 29/46* | (2006.01) | |
| *B65H 31/22* | (2006.01) | |
| *G07D 7/01* | (2016.01) | |
| *G07D 11/23* | (2019.01) | |
| *G07D 11/34* | (2019.01) | |
| *B65H 43/06* | (2006.01) | |
| *B65H 29/14* | (2006.01) | |
| *B65H 31/00* | (2006.01) | |
| *B65H 43/04* | (2006.01) | |
| *H04B 1/04* | (2006.01) | |

(52) U.S. Cl.
CPC ............. *B65H 31/22* (2013.01); *B65H 43/04* (2013.01); *B65H 43/06* (2013.01); *G07D 7/01* (2017.05); *G07D 11/13* (2019.01); *G07D 11/23* (2019.01); *G07D 11/28* (2019.01); *G07D 11/34* (2019.01); *G07D 11/50* (2019.01); *H04B 1/04* (2013.01); *B65H 2301/331* (2013.01); *B65H 2407/11* (2013.01); *B65H 2511/514* (2013.01); *B65H 2553/22* (2013.01); *B65H 2553/52* (2013.01); *B65H 2557/11* (2013.01); *B65H 2557/13* (2013.01); *B65H 2557/23* (2013.01); *B65H 2701/1313* (2013.01); *B65H 2701/1912* (2013.01)

(58) Field of Classification Search
CPC ........ B65H 29/14; B65H 31/00; B65H 43/04; B65H 29/46; B65H 31/22; B65H 43/06; B65H 2301/331; B65H 2407/11; B65H 2511/514; B65H 2553/22; B65H 2553/52; B65H 2557/11; B65H 2557/13; B65H 2557/23; B65H 2701/1313; G07D 11/0081; G07D 11/0084; G07D 7/00; G07D 7/12; G07D 7/20; G07D 7/0093; G07D 7/15; G07D 11/00; G07D 11/0003; G07D 11/0006; G07D 11/0009; G07D 11/0012; G07D 11/0021; G07D 11/0024; G07D 11/0045; G07D 11/0051; G07D 11/0054; G07D 11/0057; G07D 11/006; G07D 2207/00; G07D 2211/00; G07D 11/30; G07D 11/23; G07D 11/34; G07D 7/01; G07D 11/13; G07D 11/28; G07D 11/50; G06Q 20/3433; G06Q 20/3437; G06Q 20/1085; G06K 7/065; B07C 5/34; H04B 1/04
USPC ........ 194/206, 207, 210–213, 350; 209/534; 235/379; 382/135
See application file for complete search history.

(56) References Cited

U.S. PATENT DOCUMENTS

| | | | |
|---|---|---|---|
| 5,411,249 A | 5/1995 | Zouzoulas | |
| 5,653,436 A | 8/1997 | Zouzoulas | |
| 5,899,452 A | 5/1999 | Walsh | |
| 5,907,141 A * | 5/1999 | Deaville | G07F 9/06 194/207 |
| 6,065,672 A | 5/2000 | Haycock | |
| 6,201,474 B1 | 3/2001 | Brady et al. | |
| 6,427,998 B1 * | 8/2002 | Norrie | B65H 7/00 271/145 |
| 6,619,461 B2 | 9/2003 | Saltsov | G07D 11/0081 194/317 |
| 6,622,911 B1 * | 9/2003 | Holland-Letz | G07D 11/13 235/379 |
| 6,896,116 B2 * | 5/2005 | Deaville | G07D 11/0003 194/206 |
| 6,994,342 B2 | 2/2006 | Ito et al. | |
| D544,027 S * | 6/2007 | Nunn | D18/3.3 |
| 7,481,308 B2 * | 1/2009 | Bergeron | G07D 11/0009 194/350 |
| 7,740,120 B2 * | 6/2010 | Shimizu | G06Q 40/00 194/302 |
| 7,837,095 B2 * | 11/2010 | Clauser | G07D 11/12 235/379 |
| 7,857,198 B2 | 12/2010 | Bell | |
| 8,118,215 B2 * | 2/2012 | Coventry | G06Q 20/1085 235/379 |
| 8,851,373 B2 * | 10/2014 | MacKenzie | G07D 11/0066 235/381 |
| 9,305,414 B2 | 4/2016 | Kimoto et al. | |
| 9,505,582 B2 * | 11/2016 | Nireki | H04B 1/04 |
| 2002/0044096 A1 * | 4/2002 | Chung | G06K 7/10336 343/742 |
| 2002/0066636 A1 * | 6/2002 | Saltsov | G07D 11/0081 194/302 |
| 2002/0079361 A1 * | 6/2002 | Kosugi | G07D 11/22 235/379 |
| 2003/0015395 A1 * | 1/2003 | Hallowell | G07D 7/00 194/206 |
| 2003/0230464 A1 * | 12/2003 | Deaville | G07D 11/0003 194/302 |
| 2004/0005889 A1 | 1/2004 | Nishimura | |
| 2004/0085190 A1 | 5/2004 | Tuttle et al. | |
| 2004/0149817 A1 * | 8/2004 | Kuroiwa | G06Q 20/341 235/379 |
| 2004/0155102 A1 | 8/2004 | Bergeron et al. | |
| 2004/0169074 A1 * | 9/2004 | Washington | G07D 11/13 235/379 |
| 2004/0195758 A1 | 10/2004 | Cost | |
| 2004/0213620 A1 * | 10/2004 | Bergeron | G07D 11/0009 400/668 |
| 2004/0232217 A1 * | 11/2004 | Graef | B65H 29/06 235/379 |
| 2004/0262380 A1 | 12/2004 | Fukuda et al. | |
| 2005/0016814 A1 * | 1/2005 | McGunn | G07D 1/00 194/216 |
| 2005/0045449 A1 | 3/2005 | Nago et al. | |
| 2005/0077215 A1 | 4/2005 | Nago et al. | |
| 2005/0116032 A1 * | 6/2005 | Tripp | G07D 11/0066 235/384 |
| 2005/0150740 A1 * | 7/2005 | Finkenzeller | G07D 7/0093 194/207 |
| 2005/0156607 A1 | 7/2005 | Okamura | |
| 2005/0189702 A1 * | 9/2005 | Takeuchi | B65H 31/14 271/180 |
| 2005/0199701 A1 | 9/2005 | Tsuchiya et al. | |
| 2005/0200528 A1 | 9/2005 | Carrender et al. | |
| 2005/0200885 A1 | 9/2005 | Nishizawa et al. | |
| 2005/0237241 A1 * | 10/2005 | Garber | H01Q 1/22 343/700 MS |
| 2005/0256792 A1 * | 11/2005 | Shimizu | G06Q 40/00 705/35 |
| 2005/0265889 A1 | 12/2005 | Wu et al. | |
| 2006/0081441 A1 * | 4/2006 | Vysma | G07F 1/04 194/206 |
| 2006/0121694 A1 | 6/2006 | Tamura | |
| 2006/0151281 A1 | 7/2006 | Kuroiwa et al. | |
| 2006/0238352 A1 | 10/2006 | Hillegass et al. | |
| 2006/0290502 A1 | 12/2006 | Rawlings | |
| 2006/0293014 A1 | 12/2006 | Forster | |
| 2007/0013124 A1 | 1/2007 | Graef et al. | |
| 2007/0018833 A1 * | 1/2007 | Higashionji | A61M 5/14 340/572.7 |
| 2007/0112459 A1 * | 5/2007 | Bell | B65B 61/025 700/221 |
| 2007/0141711 A1 | 6/2007 | Stephens et al. | |
| 2007/0145064 A1 * | 6/2007 | Clauser | G07D 11/12 221/197 |
| 2007/0205259 A1 * | 9/2007 | Tocher | G07D 11/245 235/379 |
| 2007/0222606 A1 | 9/2007 | Phipps et al. | |

(56) References Cited

U.S. PATENT DOCUMENTS

| | | |
|---|---|---|
| 2007/0229253 A1* | 10/2007 | Langlotz .............. G07D 11/009 340/540 |
| 2008/0006682 A1 | 1/2008 | Bell |
| 2008/0011840 A1* | 1/2008 | MacKenzie ........ G07D 11/0066 235/385 |
| 2008/0048863 A1 | 2/2008 | Copeland |
| 2008/0219543 A1* | 9/2008 | Csulits ................... G06K 9/033 382/135 |
| 2008/0223930 A1 | 9/2008 | Rolland et al. |
| 2009/0083182 A1* | 3/2009 | Coventry ........... G06Q 20/1085 705/43 |
| 2015/0284212 A1* | 10/2015 | Nireki .................... G07D 11/28 271/306 |
| 2020/0198920 A1* | 6/2020 | Nireki .................... G07D 11/23 |

FOREIGN PATENT DOCUMENTS

| | | |
|---|---|---|
| JP | 2002-319054 | 10/2002 |
| JP | 2002-329235 | 11/2002 |
| JP | 2004-157740 | 6/2004 |
| JP | 2005-018644 | 1/2005 |

* cited by examiner

PAPER SHEET PROCESSING DEVICE

FIELD OF THE INVENTION

The present invention relates to a paper sheet processing apparatus (or device), which is incorporated into a service device such as various types of gaming machines, automatic vending machines, and the like to provide a product, a service, etc. upon insertion of a paper sheet having an economic value such as a bill, a coupon, and the like.

BACKGROUND ART

Conventionally, a bill processing apparatus, which is one of the embodiments of the above-mentioned paper sheet processing apparatus, is incorporated into a service device such as a gaming machine installed in a game hall or an automatic vending machine or a ticket vending machine installed in a public location, or the like, that identifies a validity of a bill inserted from an insertion slot by a user and provides various types of products and services according to the value of the bill that has been judged as valid. In general, such a bill processing apparatus judges whether the bill having been inserted from the insertion slot is true or false and stores the bill having been judged as true in a housing body (safe) which is mountable to and demountable from the bill processing apparatus.

In regard to the above-described bill processing apparatus, it is known to provide the housing body with a storage part such that consistency between inserted bills and bills actually housed in the housing body can be checked as disclosed in Patent Document 1. In particular, the bill processing apparatus is configured such that a bill identification control circuit board is installed in a bill identification part on an apparatus main body side, a bill housing body control circuit board is installed on the housing body side, and communication between the two is enabled via a connection terminal. That is, by sending information concerning an inserted bill from the bill identification control circuit board to the bill housing body control circuit board and storing the bill information at the storage part mounted on the bill housing body control circuit board, the information on the bills actually housed in the housing body is stored and managed.

[Patent Document 1] Japanese unexamined patent application publication No. 2005-18644

DISCLOSURE OF THE INVENTION

Problem to be Solved by the Invention

With the above-described bill processing apparatus disclosed in Patent Document 1, a power and signal line and a pair of connection terminals are disposed on the apparatus main body side while a pair of connection terminals and a power and signal line are installed on the housing body side that is attached to and detached from the apparatus main body, whereby it is possible that the communications may be disabled by an electrical contact failure between both pairs of connection terminals when the housing body is mounted onto the apparatus main body.

A paper sheet processing apparatus capable of reliably supplying information concerning paper sheets to a housing body side is provided.

Means to Solve the Problem

A paper sheet processing apparatus comprises a housing part being capable of housing a paper sheet inserted from an insertion slot, and a transmitting part wirelessly sending information on the paper sheet inserted from the insertion slot, and the housing part comprises an antenna wirelessly receiving the information sent from the transmitting part, and a storage part storing the information on the paper sheet received from the antenna. Further features of the present invention, its nature, and various advantages will be more apparent from the accompanying drawings and the following description of the preferred embodiment.

Figure 1:
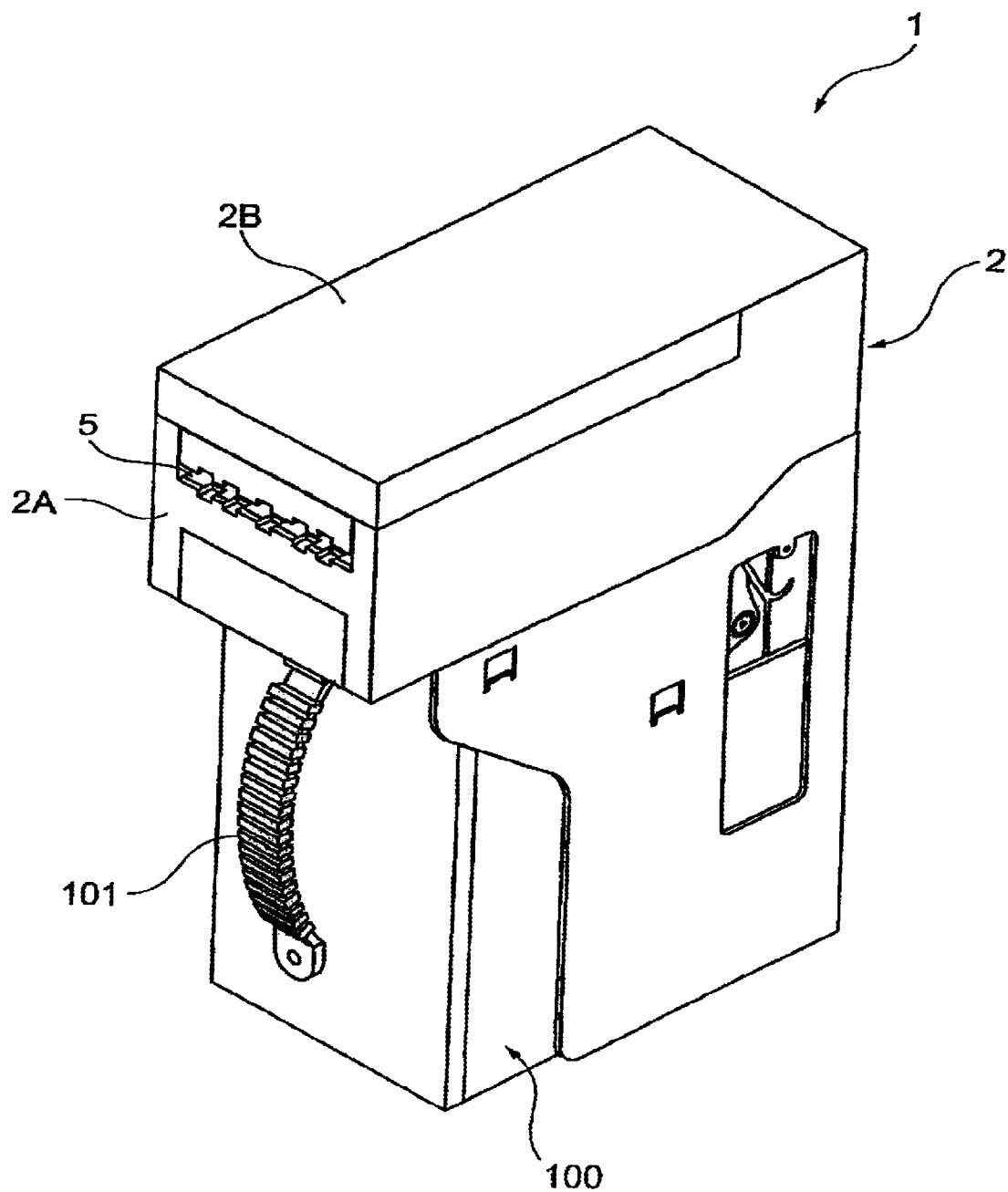
FIG. 1 is a perspective view showing an entire structure to illustrate a configuration of a bill processing apparatus of this embodiment.

DESCRIPTION OF NOTATIONS 1 bill processing apparatus
2 apparatus main body
2A frame
3 bill traveling route
5 bill insertion slot
6 bill conveyance mechanism
8 bill reading means
10 skew correction mechanism
100 bill housing part
104 storage means
104a board
104b storage part
104c coil antenna
105 placing plate
108 press standby part
115 presser plate
120 presser plate driving mechanism
140 magnetic sensor
140A magnet
142 reader/writer
200 control means
260 management server
280 management apparatus

BEST MODE FOR CARRYING OUT THE INVENTION

Figure 2:
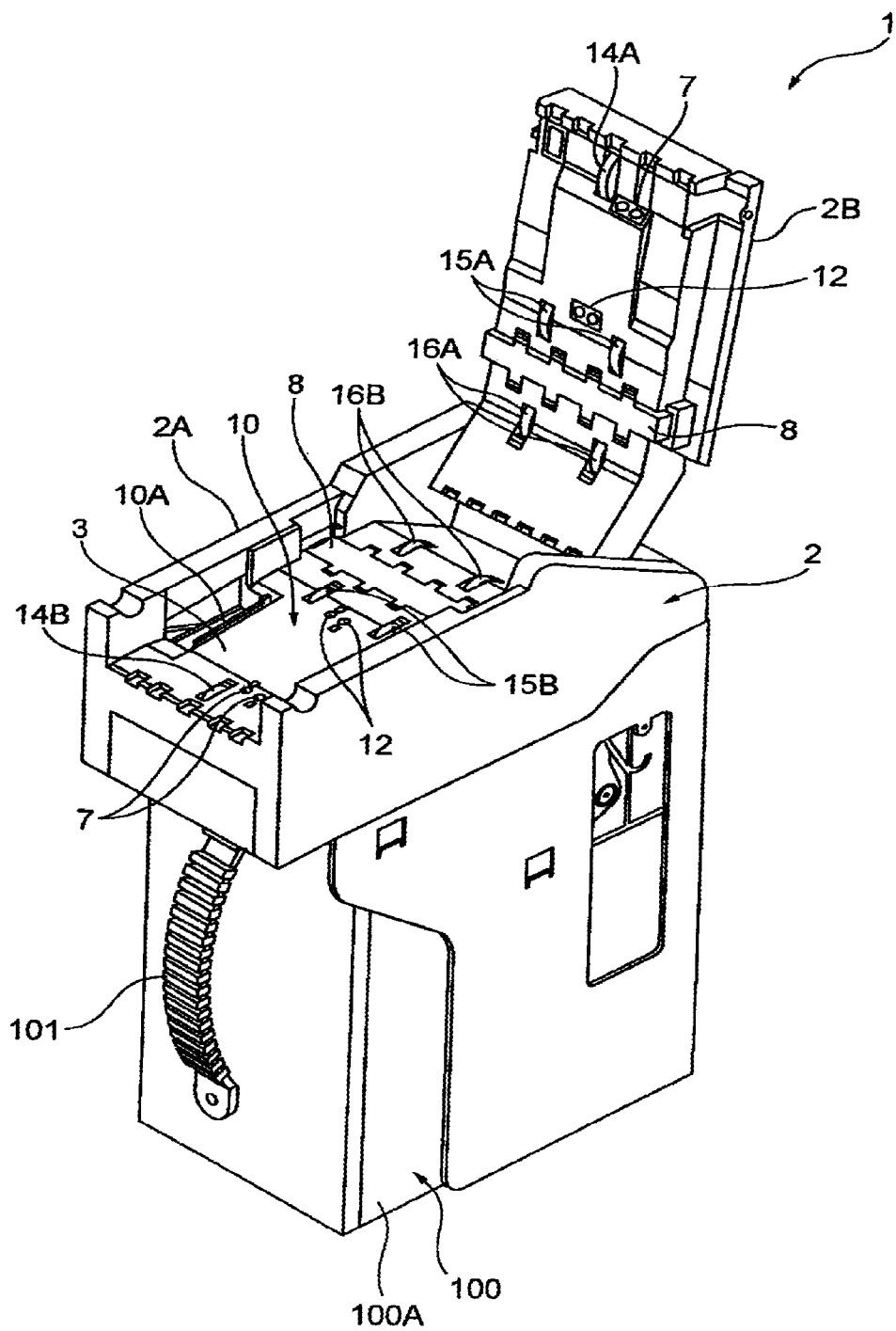
FIG. 2 is a perspective view showing the bill processing apparatus in a state that an open/close member is opened for a main body frame of an apparatus main body.
Figure 3:
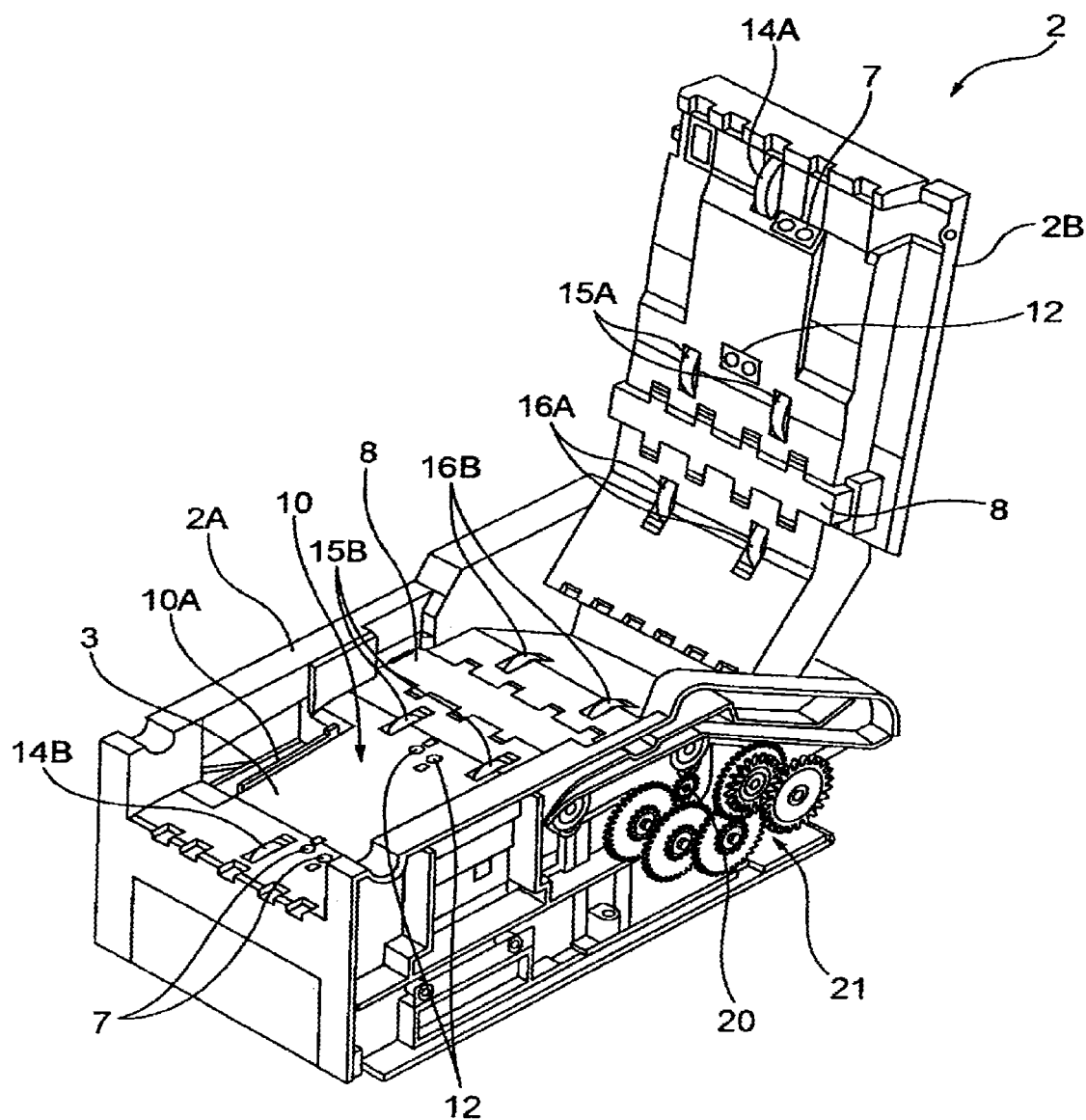
FIG. 3 is a perspective view showing a configuration of a power transmission part of the apparatus main body.
Figure 4:
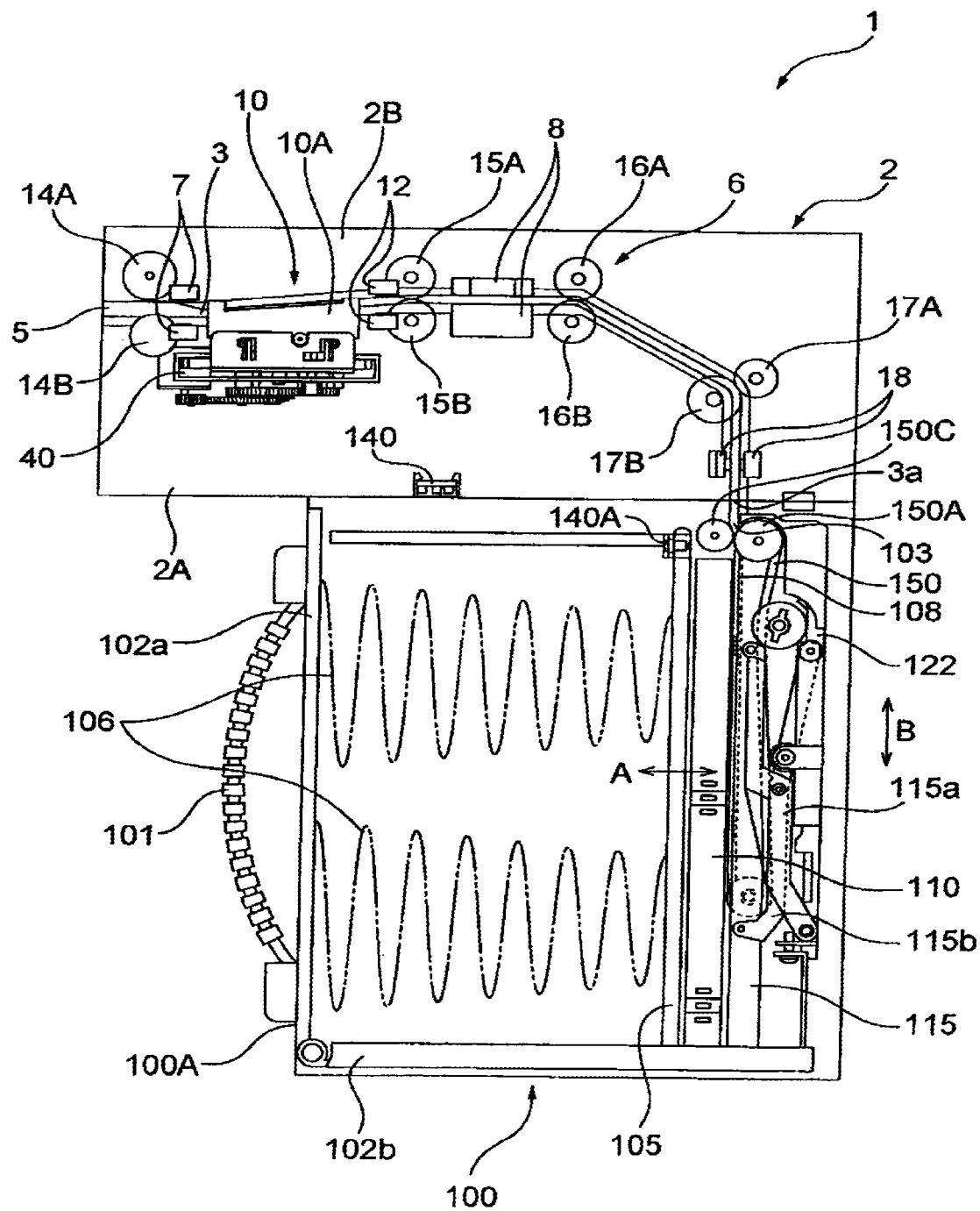
FIG. 4 is a right side view schematically showing a traveling route of a bill to be inserted from an insertion slot.
Figure 5:
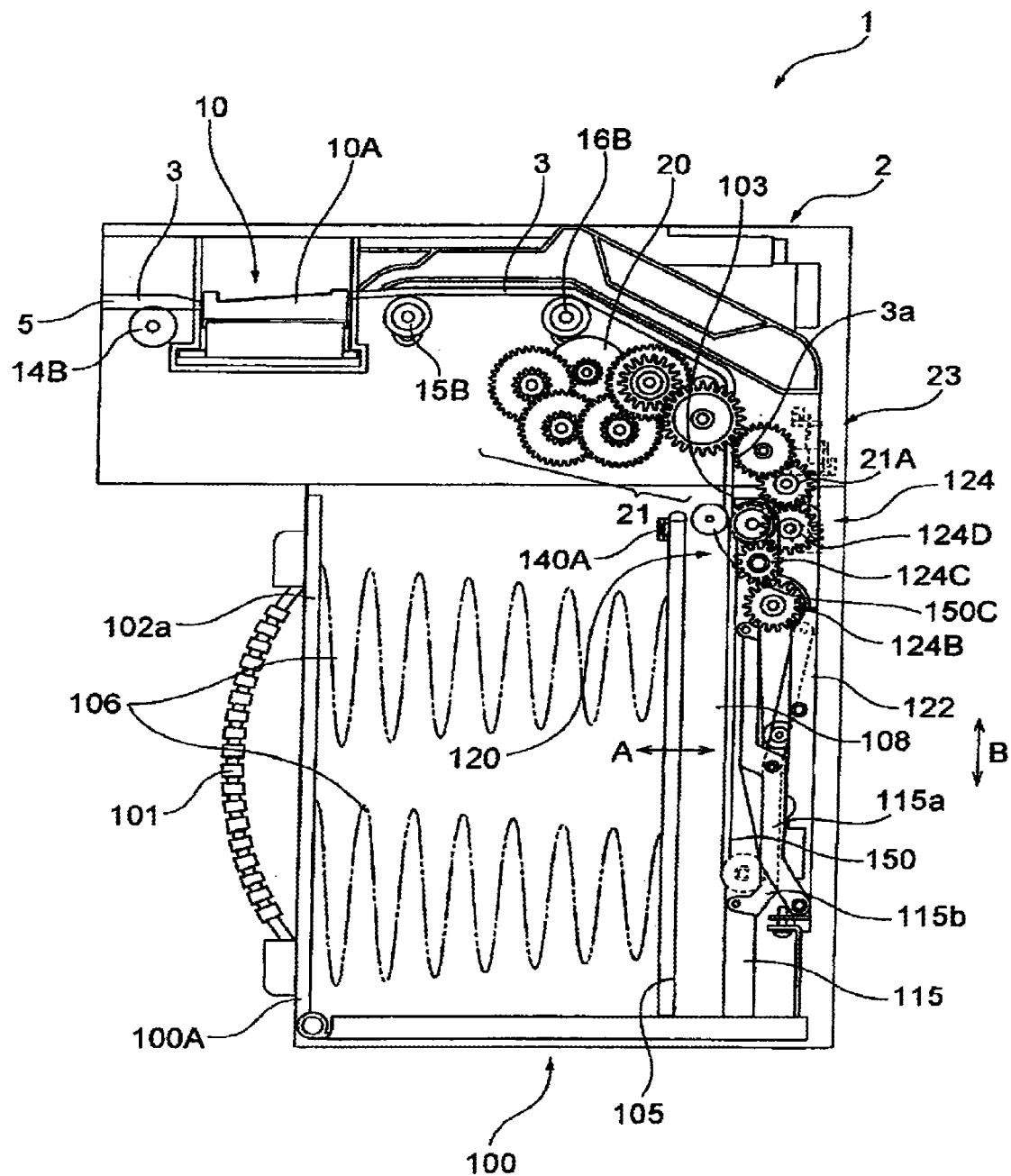
FIG. 5 is a view showing a schematic configuration of a power transmission mechanism for driving the presser plate arranged in a bill housing part.
Figure 6:
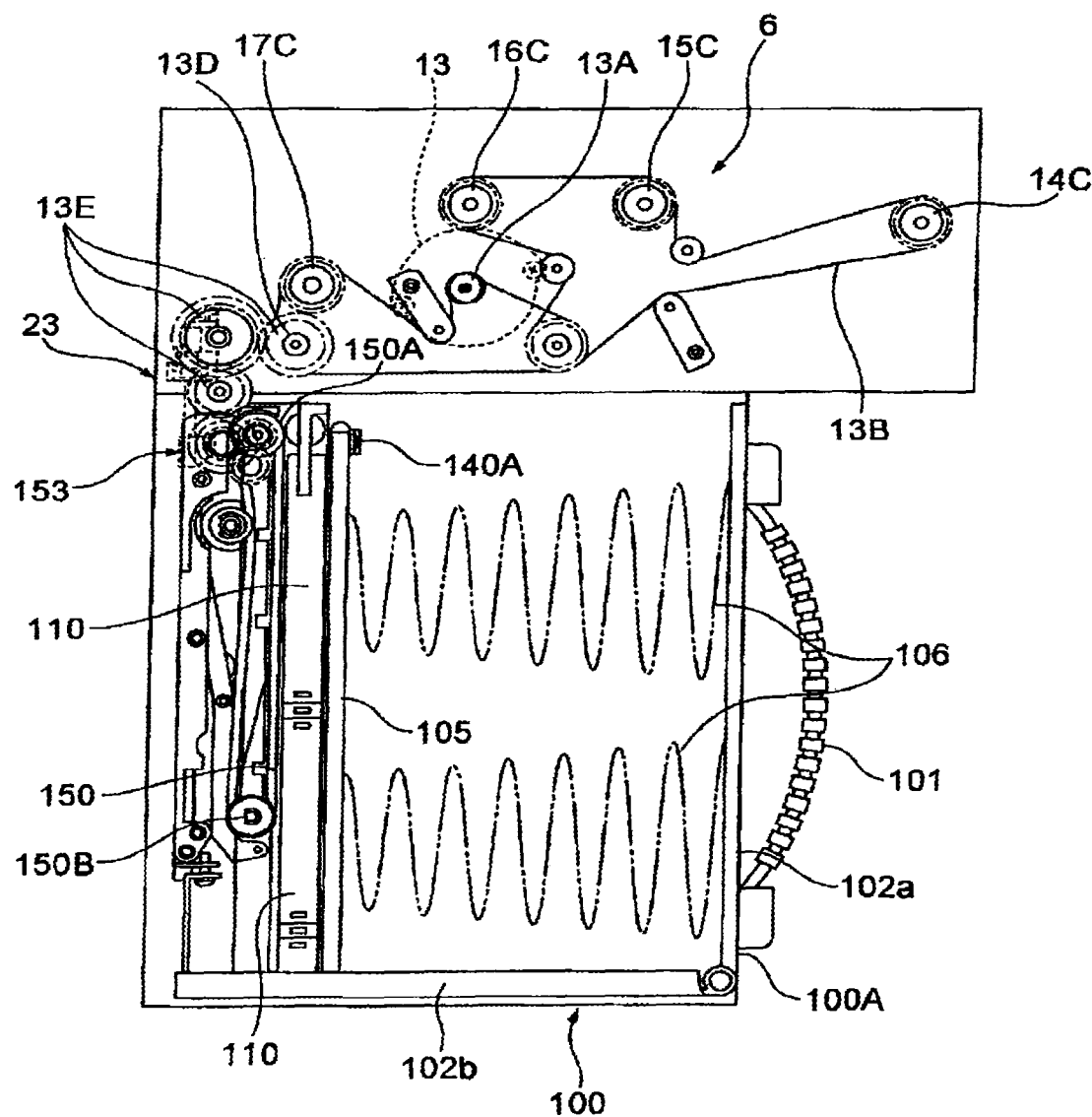
FIG. 6 is a left side view showing a schematic configuration of a driving source and a driving force transmission mechanism to drive a bill conveyance mechanism.
Figure 7:
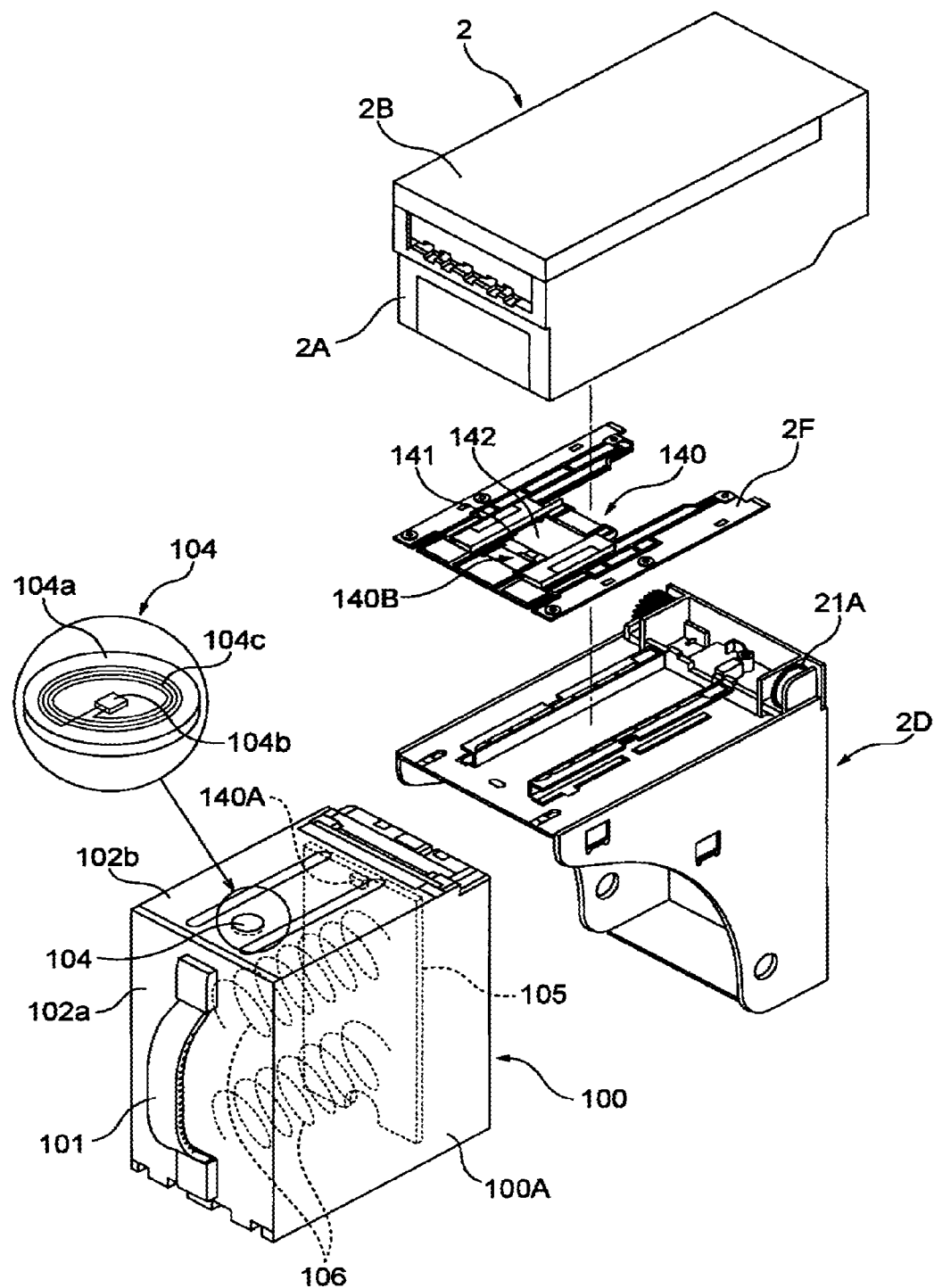
FIG. 7 is an exploded perspective view showing a bill processing apparatus.
Figure 8:
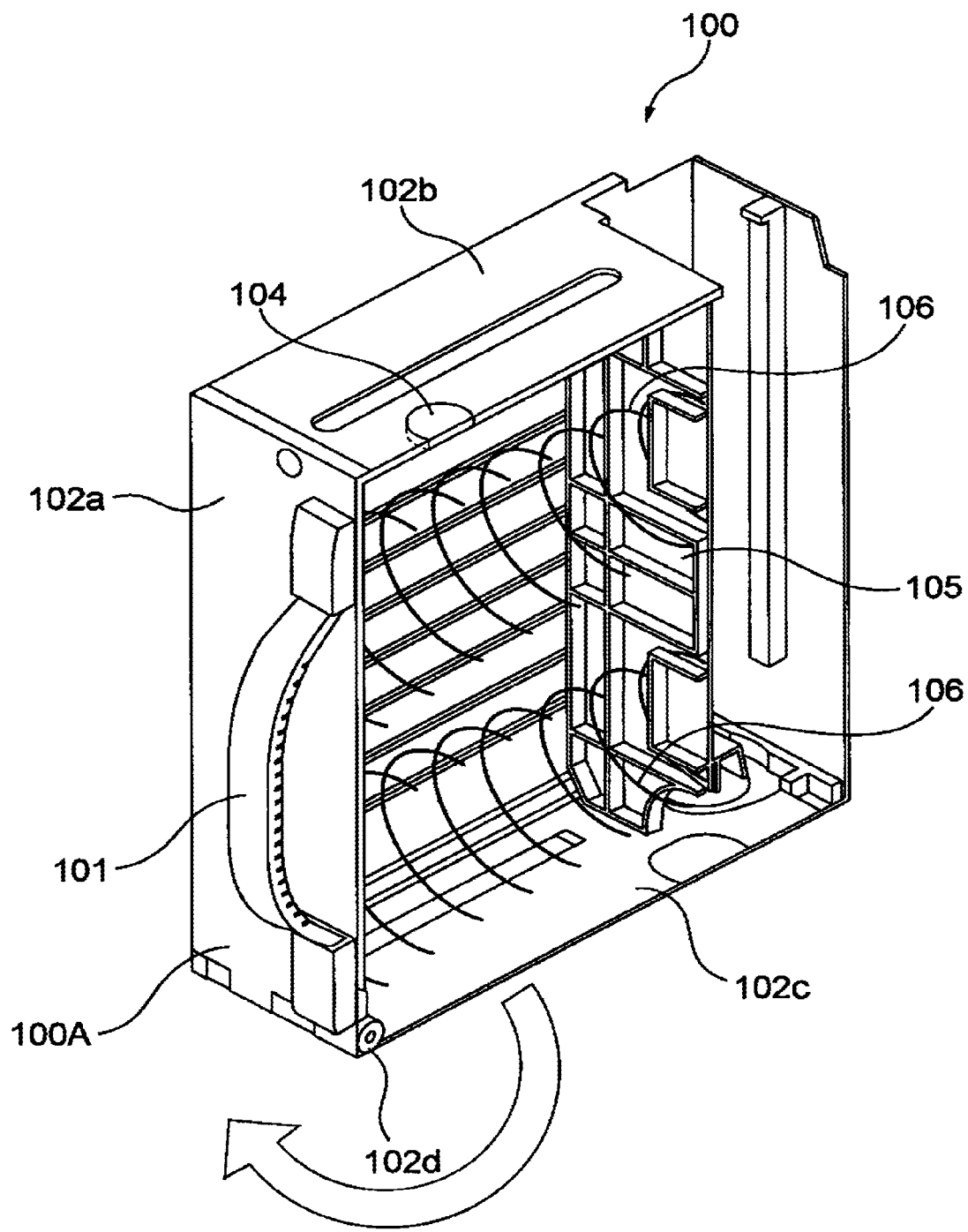
FIG. 8 is a partially cut perspective view showing an interior of a bill housing part as viewed from a side direction.
Figure 9:
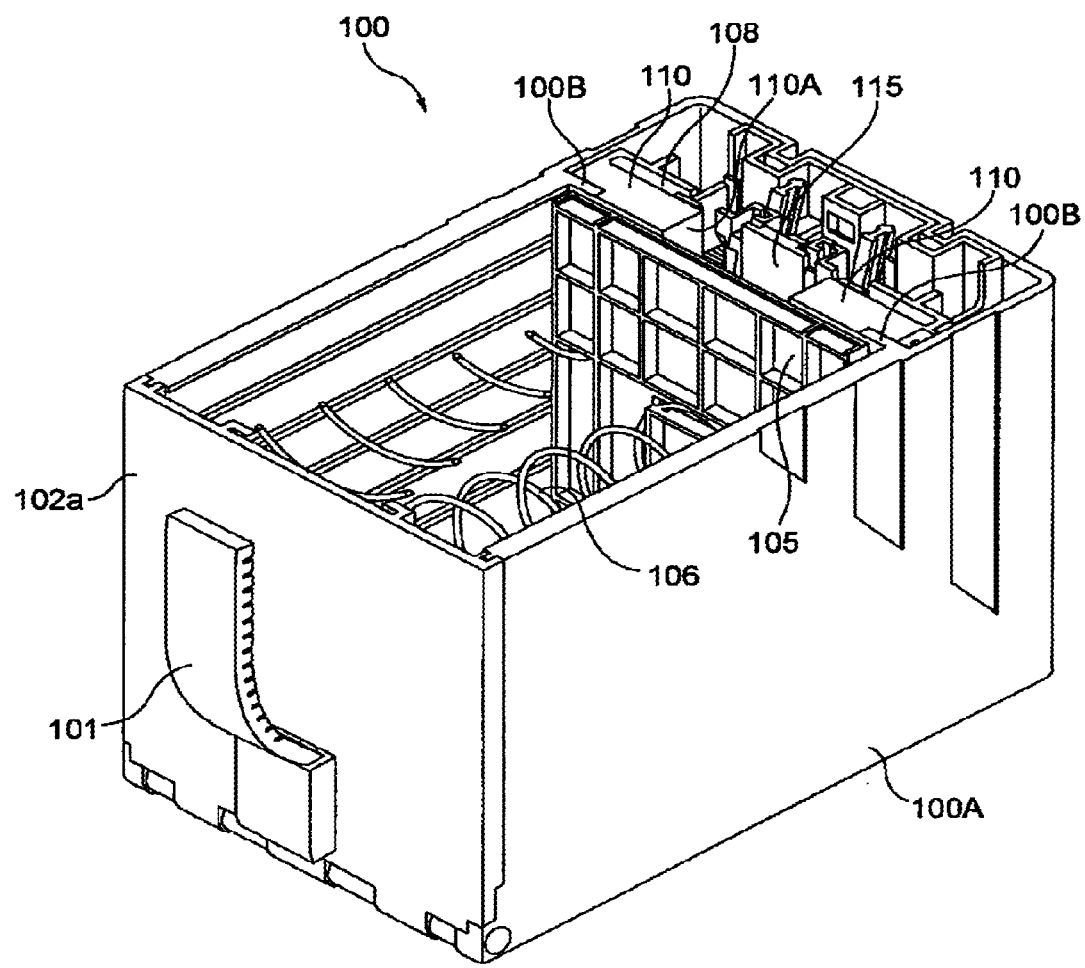
FIG. 9 is a partially cut perspective view showing an interior of the bill housing part as viewed from a top.

FIGS. 1 to 9 are diagrams showing a bill processing apparatus of a paper sheet processing apparatus as one of the embodiments according to the present invention. FIG. 1 is a perspective view showing a general configuration thereof, FIG. 2 is a perspective view showing a state that an open/close member is opened for a main body frame of an apparatus main body, FIG. 3 is a perspective view showing a configuration of a power transmission part of the apparatus main body, FIG. 4 is a right side view schematically showing a traveling route of a bill inserted from an insertion slot, FIG. 5 is a view showing a schematic configuration of a power transmission mechanism to drive a presser plate disposed in a bill housing part, FIG. 6 is a left side view showing a schematic configuration of a driving source and a driving force transmission mechanism to drive a bill conveyance mechanism, FIG. 7 is an exploded perspective view showing a bill processing apparatus, FIG. 8 is a partially cut perspective view showing an interior of a bill housing part as viewed from a side direction, and FIG. 9 is a partially cut perspective view showing an interior of the bill housing part as viewed from a top.

A bill processing apparatus 1 of this embodiment is configured to be incorporable into, for example, various types of gaming machines such as slot machines, and the bill processing apparatus 1 includes an apparatus main body 2 and a bill housing part (bill stacker) 100 which is provided on the apparatus main body 2 and is capable of stacking and housing a great number of bills. The bill housing part 100 has a function as a safe and is configured to be mountable to and demountable from a frame 2A constituting the apparatus main body 2. In this embodiment, for example, it is possible to remove the bill housing part 100 from the frame 2A of the apparatus main body 2 by pulling a handle 101 fixed to a front face thereof in a state that a lock mechanism (not shown) is unlocked.

Here, as shown in FIG. 7, the above-described bill processing apparatus 1 is mainly constituted of three structural bodies. That is, the bill processing apparatus 1 comprises the apparatus main body 2, a stand (frame member) 2D, in which the apparatus main body 2 is placed in a mountable/demountable manner, and a bill housing part 100, installed into the stand 2D in a mountable/demountable manner.

Here, a plate 2F that has installed thereon a circuit board 141 on which a magnetic sensor 140 and a reader/writer 142 for reading and writing information from and onto storage means 104 disposed on an upper wall 102b of the paper sheet housing part so as to write bill information thereon are implemented is installed onto a rear surface side of the apparatus main body 2 as a unit. The plate 2F is interposed between the frame 2A, constituting the apparatus main body, and a top surface of the stand 2D and is fixed between these components.

As shown in FIGS. 2 and 3, the apparatus main body 2 has the frame 2A and an open/close member 2B configured to be opened and closed with its one end as a rotating center with respect to the frame 2A. Then, as shown in FIG. 4, the frame 2A and the open/close member 2B are configured to form a space (bill traveling route) 3 through which a bill is carried such that both frame and member face with each other across the space when the open/close member 2B is closed for the frame 2A, and to form a bill insertion slot 5 such that front exposed faces of both frame and member are aligned and that the bill traveling route 3 exits at the bill insertion slot 5. In addition, the bill insertion slot 5 is a slit-like opening from which a short side of a bill can be inserted into the inside of the apparatus main body 2.

In the apparatus main body 2, a bill conveyance mechanism 6 that conveys a bill; an insertion detecting sensor 7 that detects the bill inserted into the bill insertion slot 5; bill reading means (including a reading device such as an optical information reading device and magnetic information reading device and the like) 8 that is installed on a downstream side of the insertion detecting sensor 7 and reads information from the bill in a travelling state; a skew correction mechanism 10 that accurately positions and conveys the bill with respect to the bill reading means 8; a movable piece passage detecting sensor 12 that detects that the bill passes through movable pieces constituting the skew correction mechanism 10; a discharge detecting sensor 18 that detects that the bill is discharged into the bill housing part 100; a presser plate detecting sensor 23 for detecting a position of a presser plate 115 pressing the bill toward a placing plate 105 in the bill housing part 100; a sensor (magnetic sensor 140) for detecting whether bills stacked and housed in the bill housing part 100 are in a predetermined state or not; and control means 200 (a control circuit board 200A; refer to FIG. 10) for controlling the driving of the bill conveyance mechanism 6, the bill reading means 8, the skew correction mechanism 10, and so on are provided.

Hereafter, the respective components described above will be described in detail. The bill traveling route 3 is extended from the bill insertion slot 5 toward the back side, and is formed to be bent so as to be inclined downward at its rear side, and to be eventually bent in the vertical direction. A discharge slot 3a from which the bill is discharged into the bill housing part 100 is formed in the bill traveling route 3, and the bill discharged therefrom is fed into a feed port (receiving port) 103 of the bill housing part 100 in the vertical direction.

The bill conveyance mechanism 6 is a mechanism capable of conveying a bill inserted from the bill insertion slot 5 along the inserting direction, and of conveying back the bill in an insertion state toward the bill insertion slot 5. The bill conveyance mechanism 6 comprises a motor 13 (refer to FIG. 6) serving as a driving source installed in the apparatus main body 2; and conveyor roller pairs (14A and 14B), (15A and 15B), (16A and 16B), and (17A and 17B) which are installed at predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 16B, and 17B installed on the underside of the bill traveling route 3 driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to carry the bill toward the back side, as shown in FIGS. 2 and 3, is installed in one portion of the center position of the bill traveling route 3, and a couple of the conveyor roller pairs (15A and 15B), (16A and 16B), or (17A and 17B) being disposed in this order on the downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is sensed by the insertion detecting sensor 7. In addition, the upper conveyor roller 14A is controllably driven to be pressed against or spaced from the conveyor roller 14B by a driving source 70 (refer to a block diagram of FIG. 10). The driving source 70 may comprise a motor, solenoid, and the like, and is installed in the open/close member 2B.

Then, the upper conveyor roller 14A is spaced from the lower conveyor roller 14B so as to release the load on the bill when a process (skew correction process) for positioning the bill for the bill reading means 8 by eliminating tilt of the inserted bill is executed by the skew correction mechanism 10, and the upper conveyor roller 14A is driven to move toward the lower conveyor roller 14B again to nip and hold the bill therebetween when the skew correction process is completed. The skew correction mechanism 10 comprises a pair of right and left movable pieces 10A (only one side is shown) that perform skew correction and the skew correction process is performed by driving a motor 40 for a skew driving mechanism.

The conveyor rollers 14B, 15B, 16B and 17B installed on the underside of the bill traveling route 3 are, as shown in FIG. 6, driven to rotate via the motor 13 and pulleys 14C, 15C, 16C, and 17C installed at the ends of the driving shafts of the respective conveyor rollers. That is, a driving pulley 13A is installed on the output shaft of the motor 13, and a driving belt 13B is wrapped around between the pulleys 14C, 15C, 16C, and 17C installed at the ends of the driving shafts of the respective conveyor rollers and the driving pulley 13A. In addition, tension pulleys are engaged in places with the driving belt 13B, which prevents the driving belt 13B from loosening.

In accordance with the configuration described above, when the motor 13 is driven to normally rotate, the conveyor rollers 14B, 15B, 16B, and 17B are driven to normally rotate in synchronization therewith to carry the bill toward the insertion direction. When the motor 13 is driven to reversely rotate, the conveyor rollers 14B, 15B, 16B, and 17B are driven to reversely rotate in synchronization therewith to carry back the bill toward the bill insertion slot 5 side.

The insertion detecting sensor 7 is to generate a detection signal when a bill inserted into the bill insertion slot 5 is detected. In this embodiment, the insertion detecting sensor 7 is installed between the pair of conveyor rollers (14A and 14B) and the skew correction mechanism 10. The insertion detecting sensor 7 comprises, for example, an optical sensor such as a regressive reflection type photo sensor. However, the insertion detecting sensor 7 may comprise a mechanical sensor other than the optical sensor.

Further, the movable piece passage detecting sensor 12 is to generate a sensed signal when it is sensed that a front end of the bill passes through a pair of right and left movable pieces 10A constituting the skew correction mechanism 10, and the movable piece passage detecting sensor 12 is installed on the upstream side of the bill reading means 8. The movable piece passage detecting sensor 12 also comprises an optical sensor or a mechanical sensor in the same way as mentioned before with respect to the insertion detecting sensor.

Further, the discharge detecting sensor 18 is to detect a trailing end of the bill passing through such that it is detected that the bill is discharged into the bill housing part 100. The discharge detecting sensor 18 is disposed just in front of the receiving port 103 of the bill housing part 100 on the downstream side of the bill traveling route 3. The discharge detecting sensor 18 also comprises an optical sensor or a mechanical sensor in the same way as the aforementioned insertion detecting sensor.

The bill reading means 8 reads bill information on the bill carried in a state that the skew is eliminated by the skew correction mechanism 10 (in a state that the bill is accurately positioned), and judges whether the bill is true or false. In detail, for example, the bill reading means 8 may comprise a line sensor that performs reading of the bill such that a bill to be carried is irradiated with light from upper and lower sides, and transmitted light therethrough and reflected light therefrom are detected by a light receiving element. A line sensor is shown in the drawing, and an optical signal read by the line sensor is photoelectric-converted, and the signal is compared and checked with data of a legitimate bill stored in advance, which makes it possible to identify the authenticity of the bill to be carried.

The bill housing part 100 stacks and houses bills one after another after the bills are identified as being legitimate by the bill reading means 8.

As shown in FIG. 7, the main body frame 100A constituting the bill housing part 100 is formed into a substantially rectangular parallelepiped (or cuboid) shape, and one end of bias means (e.g., bias spring) 106 is attached to an interior side of a front wall 102a thereof, and a placing plate 105 on which bills to be fed via the above-described receiving port 103 are sequentially stacked is provided to the other end thereof. Therefore, the placing plate 105 is in a state that it is pressed toward the presser plate 115, which will be described later, by the bias means 106.

As mentioned above, the storage means 104 is mounted on the upper wall 102b of the main body frame 100A. The storage means 104 has a function to store information concerning a bill and the like, which is sent in a noncontact manner from the apparatus main body 2 side, and is constituted of an RFID (radio frequency identification) tag in this embodiment. As shown in an enlarged manner in FIG. 7, the storage means 104 comprises an IC chip (storage part) 104b which is implemented on a board 104a made of an insulating material, and a coil antenna 104c which is printed on the board 104a and has both ends thereof connected to the IC ship 104b. Although the storage means 104 constituted of an ID tag is configured as in a passive type having no battery, it may also be configured as in an active type having a battery as well.

As mentioned above, the reader/writer 142 that writes information (mainly constituted of information about the bill identified as being authentic) into the storage means 104 is implemented on the circuit board 141 disposed on the plate 2F mounted on the rear surface side of the apparatus main body 2 and wirelessly sends the bill information and the like across a predetermined space to the storage means 104. That is, although not illustrated in detail, the reader/writer 142 disposed on the circuit board 141 comprises a communications controller which is constituted of a passive component such as an IC chip and an LCR and the like, an antenna which is connected to the communications controller and sends the bill information and the like to the coil antenna 104c of the storage means 104, and a matching circuit which performs matching based on an electromagnetic wave frequency to be used for communications and input/output impedances, whereby these components are implemented on the circuit board 141.

Further, as shown in FIG. 8, the main body frame 100A is so configured that a lower wall 102c rotates in a direction of an arrow about a spindle 102d such that the bills housed inside may be taken out. Therefore, the lower wall 102c also has a function as an opening/closing door of the bill housing part 100.

In the configuration of the bill housing part according to this embodiment, the storage means 104 is disposed on the upper wall 102b, and the storage means 104 is so arranged as to be opposite to the lower wall 102c, which is the opening/closing door, while biasing means 106 is interposed inbetween. As described above, the biasing means 106 is so configured as to have such a relationship that it is interposed between a portion serving as the opening/closing lid and the storage means whereby the biasing means (biasing spring) 106, interposed between the lower wall 102c and the storage means 104, may become such an obstruction as shown in FIG. 8 that a fraudulent activity can be prevented effectively although, for example, it is attempted to replace the legitimate storage part with another storage part storing illegitimate information for an illicit purpose by opening the lower wall 102c.

In the main body frame 100A, as shown in FIGS. 4 and 5, the presser standby part in which bills having dropped from a receiving port 103 are kept and held is also provided. A pair of regulatory members 110 are extending in a vertical direction and disposed on both sides of the placing plate of the press standby part 108. An opening 110A, through which the presser plate 115 passes in a process of successively stacking bills onto the placing plate 105, is formed between the pair of regulatory members 110.

Further, protruding walls 100B are formed on both side walls inside the main body frame 100A such that the placing plate may hit and contact thereon when the placing plate is pressed by the biasing means 106. The protruding walls 100B fulfill a role to stably hold the stacked bills by hit and contact on both sides of the uppermost bill of the stacked bills when the presser plate is biased by the biasing means as bills are successively stacked on the placing plate 105.

Further, the presser plate 115 that presses bills having fallen in the press standby part 108 from the receiving port 103 toward the placing plate 105 is arranged in the main body frame 100A. The presser plate 115 is formed in such a size that it may be capable of reciprocating through an opening formed between the pair of regulatory members 110 and is driven to reciprocate between a position where the bills are pressed onto the placing plate 105 and another position where the press standby part 108 is opened.

The presser plate 115 is driven to reciprocate as described above via a presser plate driving mechanism 120 installed in the main body frame 100A. The presser plate driving mechanism 120 comprises: a pair of link members 115a and 115b having respective ends thereof supported pivotally by the presser plate 115 so as to allow the presser plate 115 to reciprocate in an arrow A direction in FIG. 5, and these link members 115a and 115b are connected in a shape of letter "X", and the other ends opposite to the respective ends are supported pivotally by a movable member 122 installed movably in a vertical direction (an arrow B direction). A rack is formed in the movable member 122 along an arrow B direction and geared (engaged) with a pinion constituting the presser plate driving mechanism 120 (the pinion is arranged coaxially with the gear 124B in FIG. 5).

As shown in FIG. 5, a housing part side gear train 124 constituting the presser plate driving mechanism 120 is connected to the pinion. In this case, in this embodiment, as shown in FIGS. 3 and 5, a driving source (a motor 20) and a main body side gear train 21 sequentially engaged with the motor 20 are installed in the above-described apparatus main body 2, and when the bill housing part 100 is mounted to a stand 2D disposed on the apparatus main body 2, the main body side gear train 21 is to be connected to the housing part side gear train 124. The housing part side gear train 124 comprises a gear 124B installed coaxially with the pinion and gears 124C, 124D to be engaged sequentially with the gear 124B, and when the bill housing part 100 is mounted to and demounted from the apparatus main body 2, the gear 124D is configured to be engaged with and disengaged from a final gear 21A of the main body side gear train 21.

As a result therefrom, the presser plate 115 is driven to reciprocate in the arrow A direction as the motor 20 installed in the apparatus main body 2 is driven to rotate so as to drive the main body side gear train 21 and in turn the presser plate driving mechanism 120 (the housing part side gear train 124, the rack 122A formed in the movable member 122, and the link members 115a, 115b, etc.).

The magnetic sensor 140 detecting that a predetermined number of bills are placed on the placing plate 105 is installed inside the frame 2A of the apparatus main body 2. As described above, the magnetic sensor 140 is implemented on the sensor board 141 disposed on the plate 2F interposed between the stand 2D and the frame 2A that constitutes the apparatus main body 2. The magnet 140A that applies the magnetic field to the magnetic sensor 140 is fixed to a central portion of a rear surface of the placing plate 105 of the bill housing part 100.

The magnetic sensor 140 is installed at a predetermined position in a direction in which the placing plate 105 is pressed, the placing plate 105 is pressed by the presser plate 115 against the biasing force of the biasing means 106, and as a loaded amount of bills on the placing plate 105 increases and then exceeds a predetermined number of bills, the magnetic field caused by the magnet 140A becomes detected such that the detection signal is generated. The position at which the magnetic sensor 140 is installed (the position at which the threshold value is exceeded and the detection signal is generated) is determined in advance according to a size of the bill housing part to be mounted, and for example, the magnetic sensor 140 is installed so that the detection signal is generated before the bills loaded on the placing plate 105 reaches a predetermined number of bills determined in advance.

In this case, the magnetic sensor 140 (sensor board 141) may be installed at a plurality of locations along the pressing direction of the presser plate 115. For example, by installing a magnetic sensor 140B of the same kind on a further inner side along the pressing direction from the magnetic sensor 140 as shown in FIG. 7, it is also possible to detect another number of bills in relation to the bills housed in the bill housing part 100. This configuration is in consideration because another kind of bill housing part 100 having a different housing capacity may be mounted to the stand 2D, and the other kind of bill housing part 100 having another housing capacity may be mounted to the same apparatus main body 2, which can accept different kinds of bill housing parts.

Conveyor members 150 which are capable of touching the bill conveyed-in from the receiving port 103 are installed in the main body frame 100A of the bill housing part 100. The conveyor members 150 take their own role to contact the bill conveyed-in so as to stably guide the bill into an appropriate position in the press standby part 108 (position where the bill can be stably pressed without causing the bill to be moved to the right or left side when the bill is pressed by the presser plate 115). In this embodiment, the conveyor members are constituted of belt-like members (hereafter called belts 150) installed so as to face the press standby part 108.

In this case, the belts 150 are installed so as to extend along the conveying-in direction with respect to the bill, and are wrapped around the pair of pulleys 150A and 150B supported rotatably on both ends in the conveying-in direction. Further, the belts 150 contact a conveyor roller 150C extending in an axis direction which is supported rotatably in the region of the receiving port 103, and the belts 150 and the conveyor roller 150C nip and hold the bill conveyed-in the receiving port 103 therebetween to guide the bill directly to the press standby part 108. Here, in this embodiment, the pair of belts 150 are provided on the right and left sides, respectively, across the above-described presser plate 115 in order to be capable of contacting the surface on left and right sides of the bill. In addition, the belts 150 may be prevented from loosening by not only being wrapped around the pulleys 150A and 150B at the both ends, but also causing tension pulleys to push the belts 150 at the intermediate positions, respectively.

The pair of belts 150 are configured to be driven by the motor 13 that drives the above-described plurality of conveyor rollers installed in the apparatus main body 2. In detail, as shown in FIG. 6, the above-described driving belt 13B driven by the motor 13 is wrapped around a pulley 13D for the driving force transmission, and a gear train 153 installed at the end of the spindle of the pulley 150A supported rotatably on the receiving port 103 side is engaged with a gear train 13E for the power transmission sequentially installed onto the pulley 13D. That is, when the bill housing part 100 is mounted to the apparatus main body 2, an input gear of the gear train 153 is configured to be engaged with a final gear of the gear train 13E, and the pair of belts 150 are configured to be driven to rotate in a synchronized manner with the above-described conveyor rollers 14B, 15B, 16B, and 17B for conveying the bill by driving the motor 13 to rotate.

Also, the above-mentioned presser plate detecting sensor 23 is configured to be capable of detecting a position of the presser plate 115 that presses the bill toward the placing plate 105, and further, to be capable of detecting the mounting or demounting operation when the bill housing part 100 is mounted to or demounted from the stand 2D and the frame 2A of the apparatus main body 2.

Figure 10:
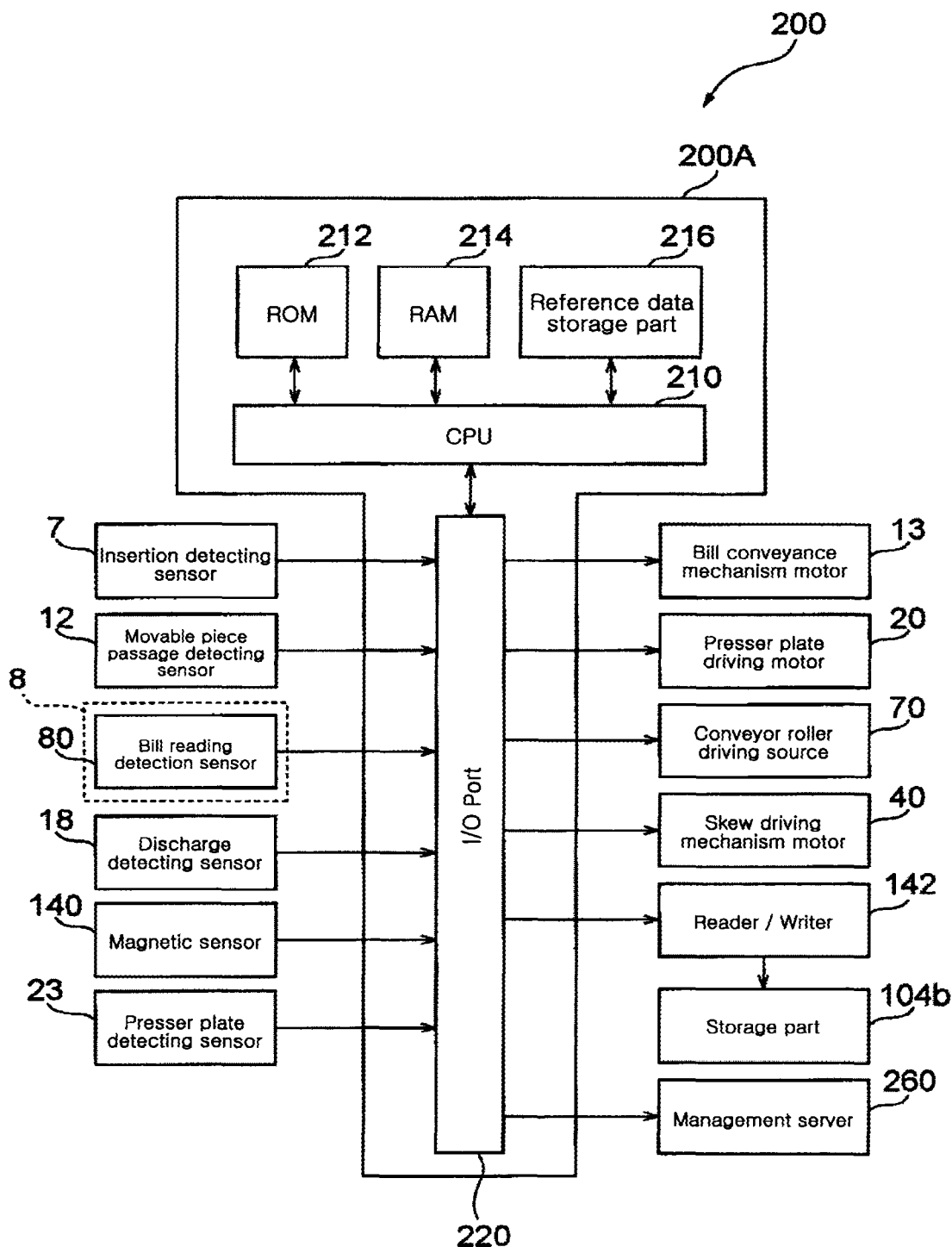
FIG. 10 is a block diagram showing control means for controlling operations of the bill processing apparatus.

Next, the control means for controlling operations of the above-mentioned paper sheet processing apparatus will be explained with reference to FIG. 10.

The control means 200 comprises a control circuit board 200A that controls the operations of the above-described respective drive units, and a CPU (Central Processing Unit) 210 constituting bill identification means, a ROM (Read Only Memory) 212, a RAM (Random Access Memory) 214, and a reference data storage part 216 are mounted on the control circuit board.

In the ROM 212, various types of programs such as operation programs for the respective drive units such as the motor 13 that drives the above-described bill conveyance mechanism, the motor 20 that drives the presser plate, the driving source 70 that drives the conveyor roller 14A to contact/be spaced from the conveyor roller 14B, the motor 40 to drive the skew driving mechanism 10; an authenticity judgment program for the bill read by the bill reading means 8; and permanent data are stored. The CPU 210 generates control signals according to the programs stored in the ROM 212, carries out the input and output of the signals with respect to the respective drive units via an I/O port 220, and controls the driving of the respective drive units.

Further, detection signals from various types of sensors such as the insertion detecting sensor 7, the movable piece passage detecting sensor 12, the discharge detecting sensor 18, the magnetic sensor 140, the presser plate detecting sensor 23 for detecting the position of the presser plate 115, and the like are to be input to the CPU 210 via the I/O port 220, and the driving of the respective drive units is controlled on the basis of these detection signals.

Further, data and programs used for the operation of the CPU 210 are stored in the RAM 214, and reference data used for the performance of a bill authenticity judgment, for example, various types of data acquired from all the printing areas of the legitimate bill (such as data about contrasting density and data about transmitted light or reflected light when the bill is irradiated with infrared ray) are stored as reference data in the reference data storage part 216. In addition, the reference data is stored in the dedicated reference data storage part 216. However, the data may be stored in the ROM 212.

Then, a bill reading detection sensor (for example, a line sensor) 80 constituting the above-described bill reading means 8 is connected to the CPU 210 via the I/O port 220, and bill reading data read by the bill reading detection sensor 80 is compared with the reference data stored in the reference data storage part 216 such that a bill authenticity judgment process is executed.

The aforementioned CPU 210 is configured to send the bill information concerning information of bills to be housed in the bill housing part to the reader/writer 142 via the I/O port 220. That is, the CPU 210 compares the bill reading data read by the bill reading detection sensor 80 with the reference data stored in the reference data storage part 216 to execute the bill authenticity judgment process, and, when the corresponding bill is judged to be authentic, drives the reader/writer 142 to execute writing of the information of the bill having been judged to be authentic into the storage means (ID tag) 104 installed on the bill housing part 100.

Here, in addition to the bill information to be housed (monetary information), information about time of respective insertions of bills and ID information identifying the specific apparatus main body 2 may also be stored in association with each other in the storage means 104. In detail, for example, when a specific bill housing part 100 is mounted on the apparatus main body 2, unique ID information provided in advance to the apparatus main body 2 of the bill processing apparatus 1 is so written into the storage part 104b of the storage means 104 that the apparatus main body 2 and the specific bill housing part 100 are associated with each other.

Figure 11:
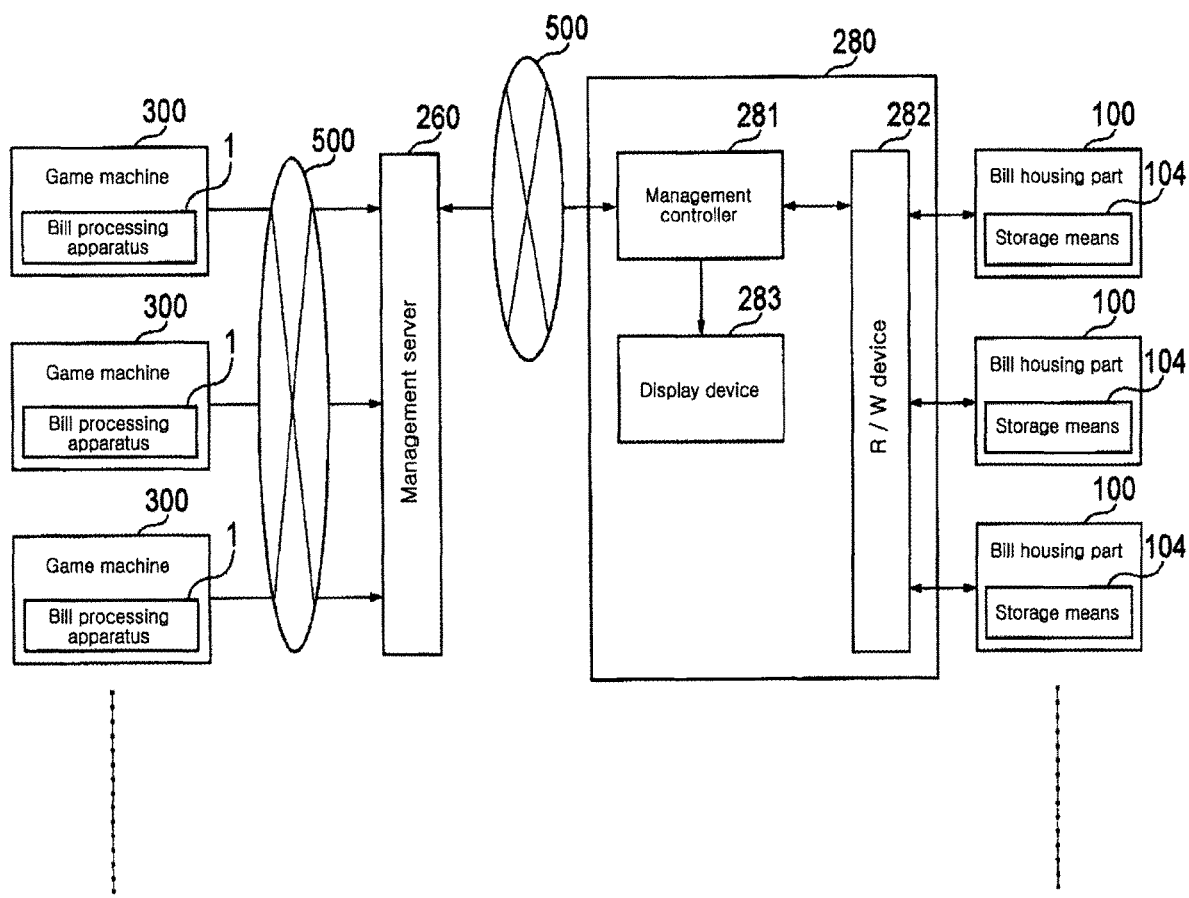
FIG. 11 is a block diagram showing schematically a configuration of external devices to manage deposit information of housed bills in the bill processing apparatus.

The CPU 210 is also configured to send the same bill information as written in the storage means 104 by the reader/writer 142 to an externally connected management server 260 via the I/O port 220, wherein the thus-sent bill information is associated with the above-described unique ID information. As shown in FIG. 11, in this embodiment, the management server 260 is configured to manage (as a hall computer managing a game hall) a plurality of gaming machines 300, into which the bill processing apparatuses 1 are incorporated respectively, and each of the bill processing apparatuses sends its own bill information of deposited amount in association with its unique ID information such that the management server 260 stores and manages each monetary information of deposited amount along with the unique ID information. Here, sending and receiving of information are performed via the internet or a LAN such as a dedicated communications network 500 between the management server 260 and the respective gaming machines 300 (bill processing apparatuses 1).

In regard to a bill housing part 100 that is removed from the above-described bill processing apparatus 1, for example, a management apparatus 280 that reads the information stored in the respective storage means (ID tags) 104 may be used as shown in FIG. 11 to manage the bills housed inside. In detail, the management apparatus 280 comprises a management controller 281 including a CPU, storage means, and the like, a reader/writer device (R/W device) 282 being capable of wirelessly reading the deposit information recorded in the storage means (ID tag) 104 incorporated into the bill housing part 100, and a display device 283 such as a display.

In the management apparatus 280, it is possible to check a fraudulent activity, when the deposit information recorded in the storage means (ID tag) 104 of each bill housing part 100 is read by the reader/writer device 282, by performing data collation of the thus-read deposit information with the deposit information according to each bill housing part having been recorded in the above-described management server 260 (deposit information matching process).

Alternatively, while the display device 283 shows the deposit information read by the reader/writer device 282, the bills actually housed in the bill housing part 100 are taken out and counted such that the deposit information and the counted amount are compared so as to check the fraudulent activity. Here, in addition to such a check, a double check can be performed to improve the reliability by performing the deposit information matching process as described above with respect to the aforementioned management server 260.

As described above, the bill processing apparatus 1 and the bill housing part 100 are so associated with the ID information, even after a plurality of bill housing parts 100 are removed from many gaming machines in order to collect the bills, that the apparatus main bodies on which the corresponding bill housing parts are to be mounted can be easily located, and further, from the monetary information of the housed bills, it is possible to specify easily which gaming machines 300 have been popular.

Also, in each bill processing apparatus 1, the information concerning the bill inserted from the bill insertion slot 5 and housed in the bill housing part 100 is wirelessly sent and received between the reader/writer 142 serving as the transmitting part and the coil antenna 104c of the storage means (ID tag) 104 as described above such that it is not necessary to install a connection terminal or a power and signal line in each of the apparatuses, which used to be required conventionally, whereby the contact failure between connection terminals of both may not occur. Therefore, the information concerning the bill can thus be provided reliably from the apparatus main body 2 to the bill housing part 100 side.

Also, in the above-described configuration, the coil antenna 104c of the storage means (ID tag) 104 is installed on a surface side (upper wall 102b) along the direction of mounting-and-demounting of the bill housing part 100 and the reader/writer 142 to serve as the transmitting part sending the bill information is installed on a portion opposite to the upper wall 102 of the bill housing part 100 such that it may be possible to reduce the probability to cause the communications failure between them even if the bill housing part 100 is incompletely mounted on the stand 2D to which the frame 2A of the apparatus main body 2 is fixed.

Figure 12A:
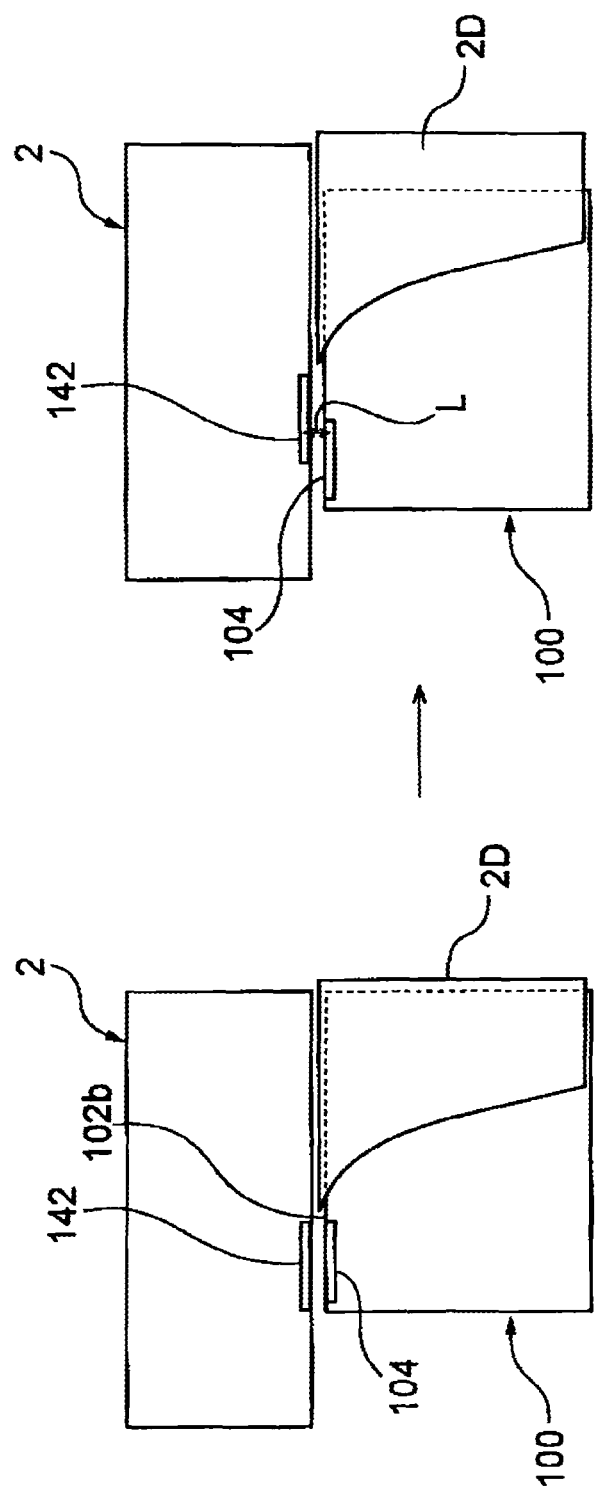
FIG. 12A is a schematic view showing a configuration of a reader/writer and storage means arranged in a mounting-and-demounting direction of the bill housing part.
Figure 12B:
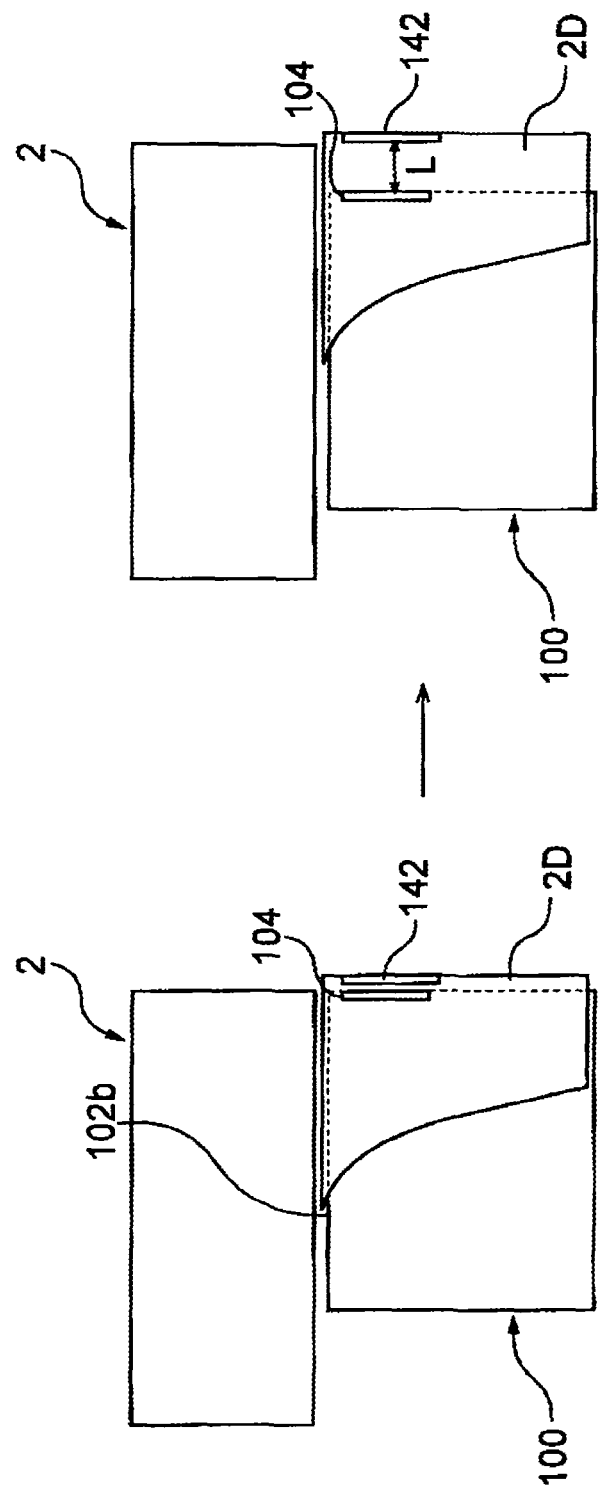
FIG. 12B is a schematic view showing a configuration of a reader/writer and storage means arranged in a vertical direction to the mounting-and-demounting direction of the bill housing part.
Figure 12C:
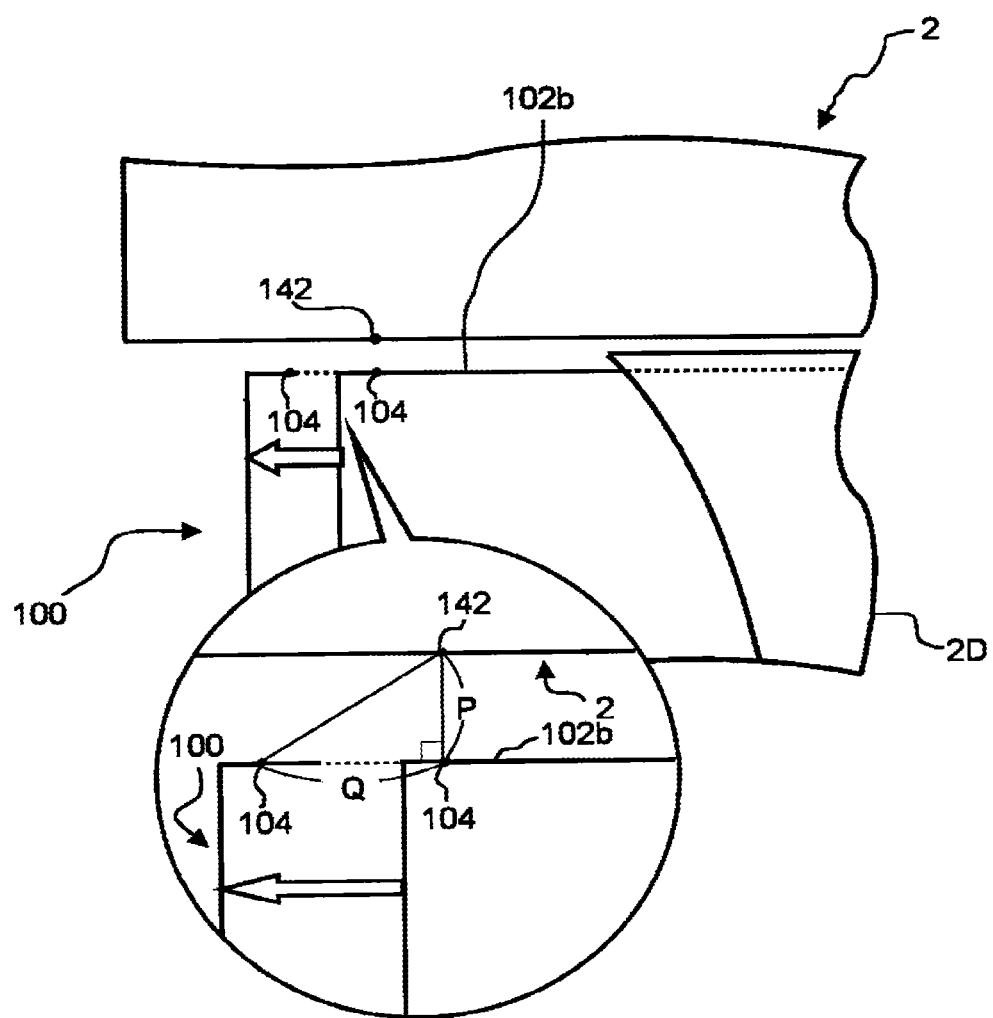
FIG. 12C is a partially enlarged schematic view illustrating a distance change between both points as the reader/writer and the storage means are referred to as respective points in the case of FIG. 12A.
Figure 12D:
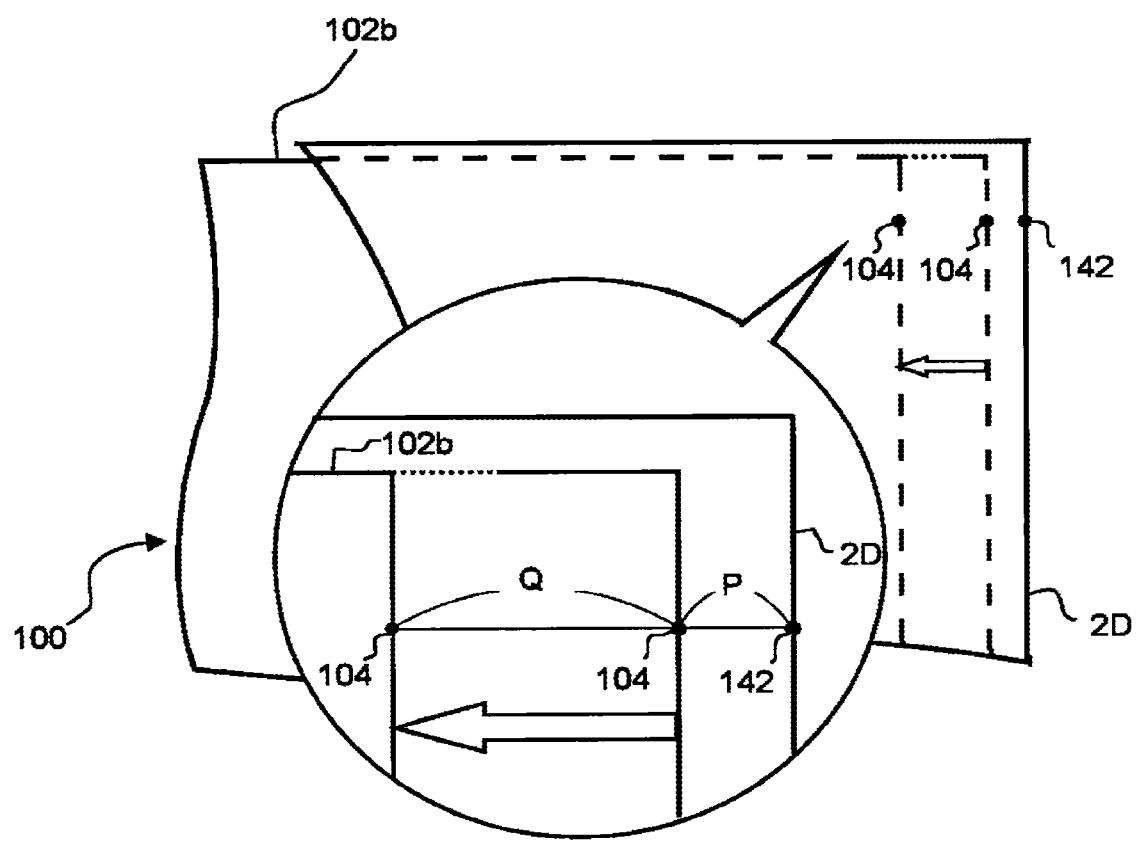
FIG. 12D is a partially enlarged schematic view illustrating a distance change between both points as the reader/writer and the storage means are referred to as respective points in the case of FIG. 12B.
Figure 13:
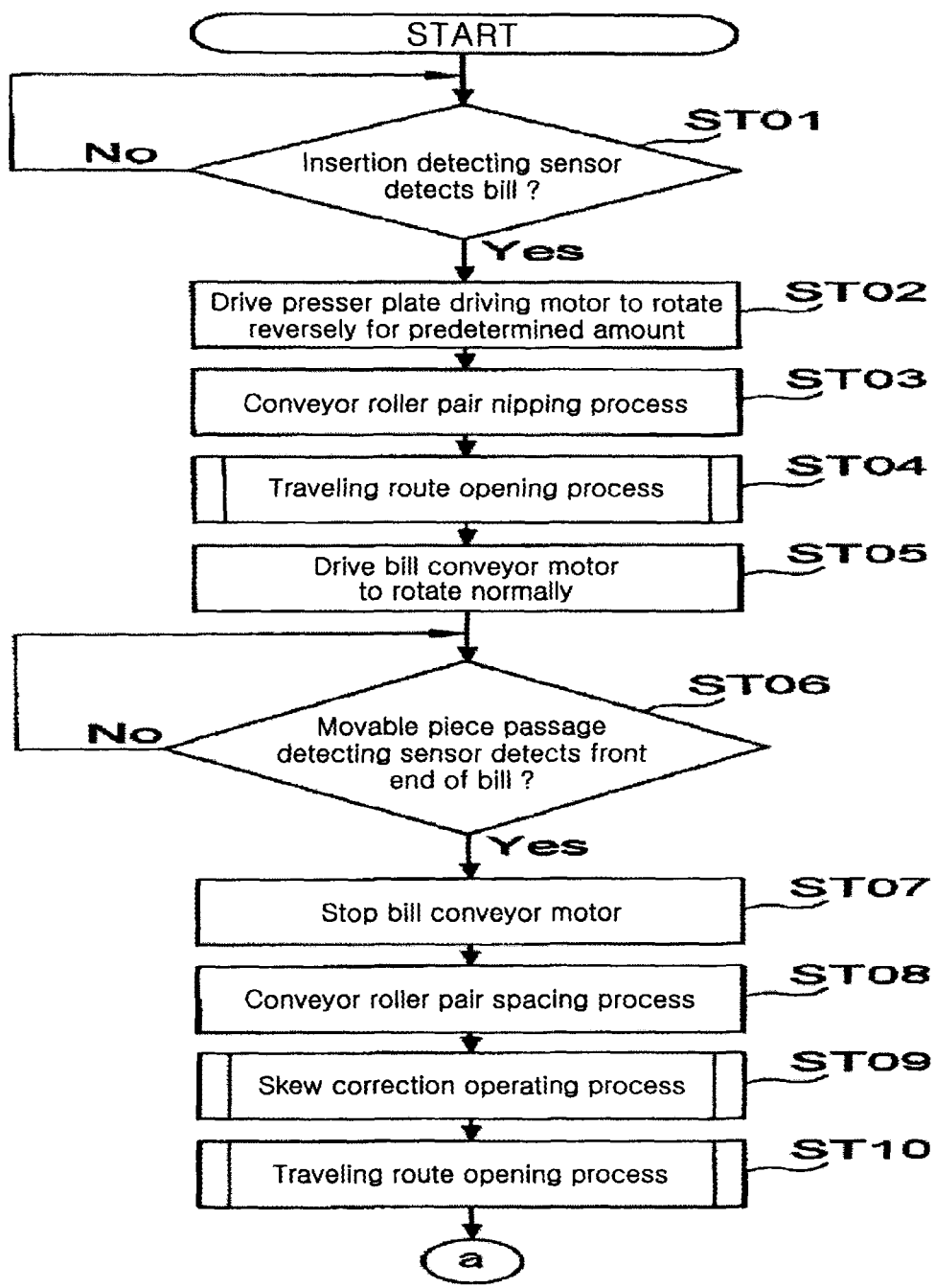
FIG. 13 shows a flowchart (part one) illustrating processing operations for processing a bill in a bill processing apparatus of this embodiment.
Figure 14:
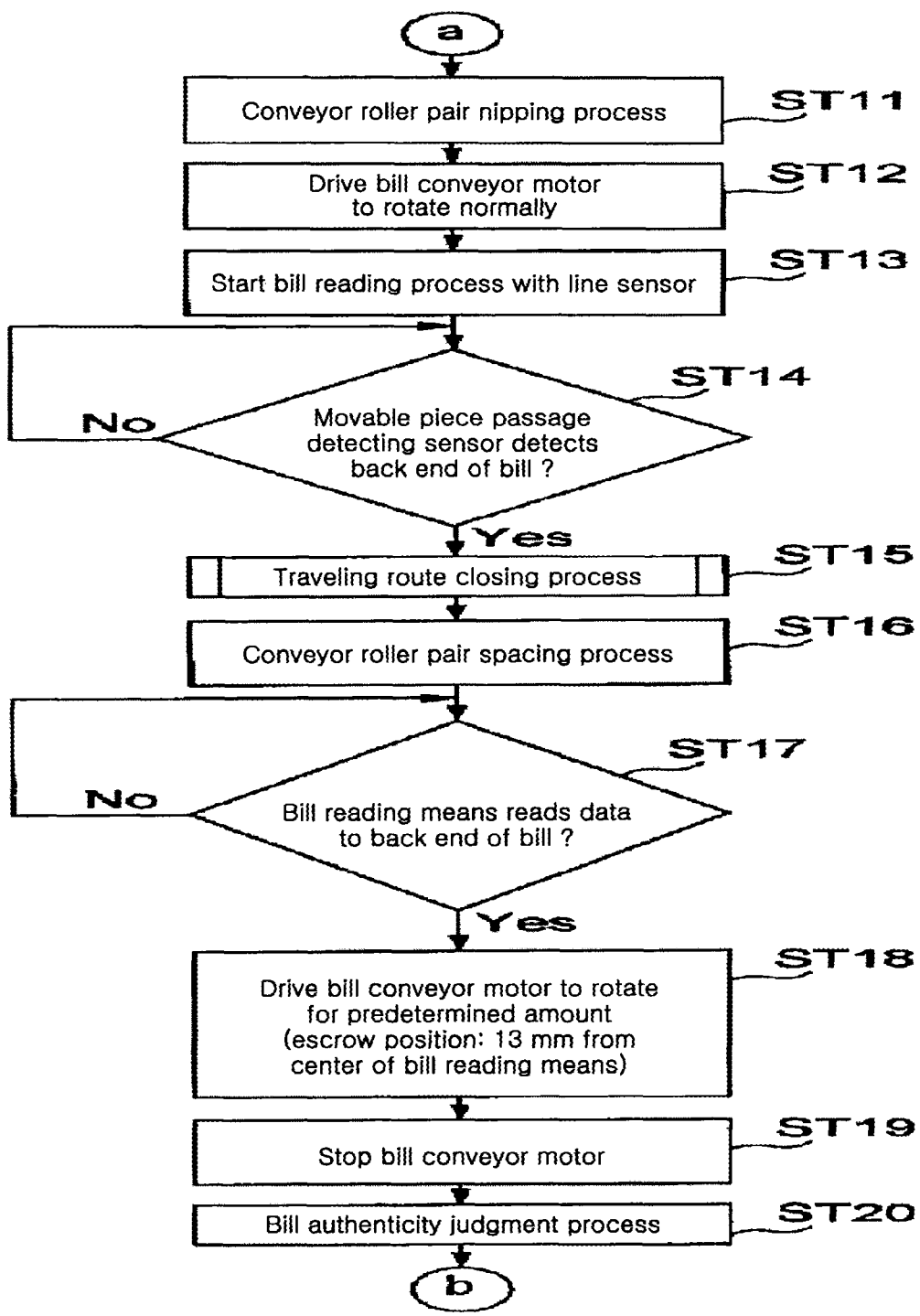
FIG. 14 shows a flowchart (part two) illustrating processing operations for processing a bill in a bill processing apparatus of this embodiment.
Figure 15:
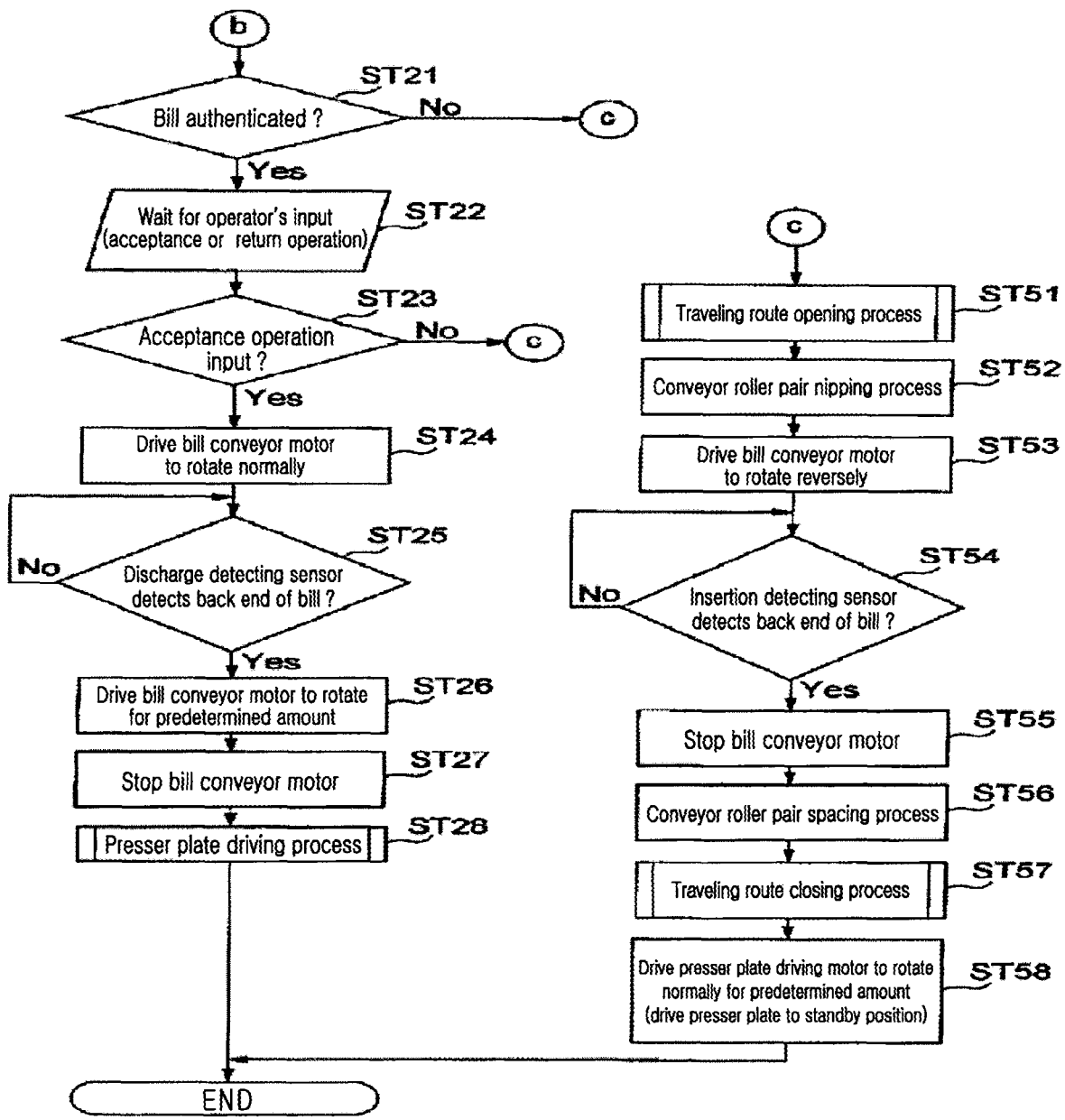
FIG. 15 shows a flowchart (part three) illustrating processing operations for processing a bill in a bill processing apparatus of this embodiment.
Figure 16:
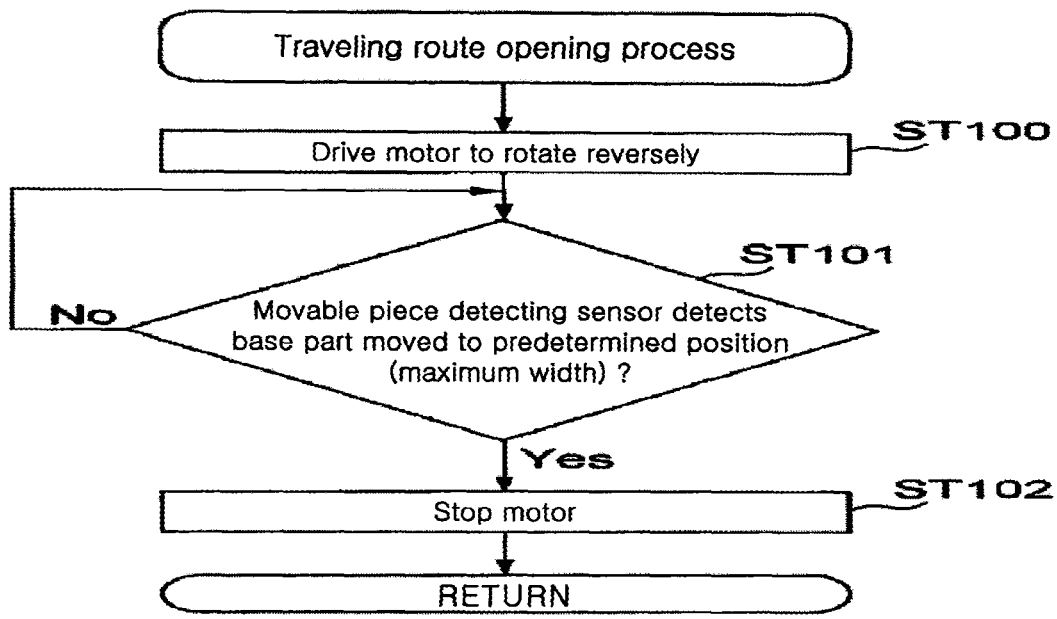
FIG. 16 shows a flowchart illustrating processing operations of a traveling route opening process.

In detail, as shown in FIGS. 12A and 12B, the bill housing part 100 is mounted to and demounted from the stand 2D of the apparatus main body 2 as the upper wall 102b and a ceiling plate of the stand 2D which is substantially parallel to the upper wall 102b slide with each other without collision. That is, the upper wall 102b and the ceiling plate are in such a positional relationship that they pass by each other and movements of both may not cause a collision or a bump (passing-by movement or structure). For example, such a positional relationship can include the case that two bodies relatively moving would not cross a sliding surface and such a surface exists [in a distance between two bodies]. The coil antenna 104c of the storage means (including a storage device) 104 is disposed on the upper wall 102b and the transmitting part 142 as a counter part is disposed on the plate 2F arranged on the ceiling plate such that the sliding surface divides an upper side and a lower side. As shown in FIG. 12B, the reader/writer 142 and the coil antenna 104c of the storage means are arranged in a direction perpendicular to a mounting-and-demounting direction of the bill housing part 100 such that a distance L may be produced between them as shown in a right diagram of FIG. 12B if the bill housing part 100 is incompletely mounted onto the stand 2D whereby the bill information may not be sent reliably. In such a case, the upper wall 102b and the ceiling plate of the stand 2D substantially parallel thereto are in the positional relationship of passing-by, but the coil antenna 104c of the storage means 104 and the transmitting part 142 are not in the positional relationship of passing-by. They contact (collide) with each other if they move in the mounting-and-demounting direction. On the other hand, as shown in FIG. 12A, the distance L between the reader/writer 142 disposed on the frame side of the apparatus main body and the coil antenna 104c of the storage means 104 disposed on the bill housing 100 side can be made within the range for enabling communications thereof in either case of a complete mounting state as shown in a left diagram or of an incomplete mounting state of the bill housing part 100 onto the stand 2D as shown in a right diagram whereby the possibility of communications failure between them may be reduced. In FIG. 12B, the coil antenna 104c of the storage means 104 may collide on the transmitting part 142 if they become too close such that both may be damaged. On the other hand, the possibility to cause the communications failure may be increased if they do not become close enough. In particular, it is possible to keep an optimal positional relationship even though there is some misalignment as shown in FIG. 12A if the antenna 104c has a receiver sensitivity spreading homogenously in parallel to a sliding surface. On the other hand, even though the sending and receiving are made between the reader/writer 142 as a point and the storage means 104 as another point, the configuration as shown in FIG. 12 is preferable. As shown in FIGS. 12C and 12D, for example, assuming the optimal distance between the reader/writer 142 and the storage means 104 is P and that the misalignment from the optimal distance is Q, then the distance between the reader/writer 142 and the storage means 104 is $(P^2+Q^2)^{0.5}$ and (P+Q), respectively. If these are compared, (P+Q) is larger. Here, the coil antenna as referred to so far may be a loop antenna. For example, a small loop antenna has the maximum directionality in a perpendicular direction to the loop surface and null directionality on the loop surface. As the transmission system, an electromagnetic coupling type (mutual induction system) and a long wave having 550 KHz or less may be employed. Further, with a short wave band having 13.56 MHz or a long wave band having 135 KHz or less applied to the coil antenna, an electromagnetic induction type (induced electromagnetic system) which utilizes transmission medium to transmit magnetic field generated around the antenna may be utilized.

Although the positional relationship of the reader/writer 142 and the storage means 104 is thus preferably a relationship as shown in FIG. 12A, it is of course OK to have a positional relationship as shown in FIG. 12B. Here, in the case of a positional relationship as shown in FIG. 12B, the front wall 102a as shown in FIG. 7 is preferably configured as the opening/closing lid installed on the bill housing part 100. That is, such a positional relationship is arranged that the biasing means is interposed between the opening/closing lid and the storage means whereby a fraudulent activity performed on the storage means 104 upon opening the opening/closing lid can thereby be prevented effectively.

Next, the bill processing operation in the bill processing apparatus 1 executed by the control means 200 will be described with reference to the flowcharts of FIGS. 13 to 19.

When an operator inserts a bill into the bill insertion slot 5, the conveyor roller pair (14A and 14B) installed in the vicinity of the bill insertion slot is in a state that the rollers are spaced from each other in an initial stage (refer to ST16 and ST56 to be described later). Further, with respect to the presser plate 115, the pair of link members 115a, 115b driving the presser plate 115 are positioned in a pathway of the press standby part 108, and the presser plate 115 is so positioned (hereinafter, called "standby position") that the pair of link members 115a, 115b prevent the bill from being conveyed into the press standby part 108 from the receiving port 103 (refer to ST134 to be described later). That is, in this state, the presser plate 115 is brought into the opening 110A formed between the pair of regulatory members 110 such that the opening through which the bill passes is in an occluded state so as to prevent the bill stored in the bill housing part from being drawn out.

Moreover, the pair of movable pieces 10A constituting the skew correction mechanism 10 located on the downstream side of the conveyor roller pair (14A, 14B) are in a state that the pair of movable pieces 10A are moved to leave the minimum open width therebetween (for example, an interval between the pair of movable pieces 10A is 52 mm; refer to ST15 and ST57 to be described later) so as to prevent the bill from being drawn out in the initial stage.

When the above-described pair of conveyor rollers (14A and 14B) are in the initial state, the operator easily insert a wrinkled bill into the bill insertion slot 5. Then, when the insertion detecting sensor 7 detects the insertion of the bill (ST01), the driving motor 20 of the above-described presser plate 115 is driven to rotate reversely for a predetermined amount (ST02) to move the presser plate 115 to the initial position. In this initial position, the press standby part 108 is in an open state (refer to FIG. 5), and the bill can be conveyed into the inside of the bill housing part 100. That is, by driving the motor 20 to rotate reversely for a predetermined amount, the presser plate 115 is driven from the aforementioned standby position to the initial position via the main body side gear train 21 and the presser plate driving mechanism 120 (the housing part side gear train 124, the rack formed on the movable member 122, and the link members 115a and 115b etc.). The press standby part 108 is opened by the movement of the presser plate 115 such that the bill can be conveyed into the inside of the bill housing part.

In this state, the above-described driving source 70 is driven to move the upper conveyor roller 14A so as to make a contact with the lower conveyor roller 14B. In accordance therewith, the inserted bill is nipped and held therebetween by the pair of conveyor rollers (14A and 14B) (ST03).

Next, a traveling route opening process is conducted (ST04). The opening process is conducted by driving the pair of movable pieces 10A to move in separating directions so as to become apart with each other as the motor 40 for the skew correction mechanism is driven to rotate reversely as shown in the flow chart of FIG. 16 (ST100). At this time, when it is detected that the pair of movable pieces 10A have moved to the predetermined positions (the maximum open width positions) by the movable piece detecting sensor that detects positions of the pair of movable pieces 10A (ST101), the driving operation to rotate the motor 40 reversely is stopped (ST102). This traveling route opening process allows the bill to enter between the pair of movable pieces 10A. In addition, in the previous step of ST04, the bill traveling route 3 is in a closed state by a traveling route closing process (ST15, ST57) to be described later. Thus, the bill traveling route 3 is closed in this way before an insertion of the bill so as to prevent an element such as a line sensor from being broken by, for example, inserting a plate-like member from the bill insertion slot for illicit purposes or the like.

Next, the bill conveyor motor 13 is driven to rotate normally (ST05). The bill is carried into the inside of the apparatus by the conveyor roller pair (14A and 14B), and when the movable piece passage detecting sensor 12 installed on the downstream side from the skew correction mechanism 10 detects the front end of the bill, the bill conveyor motor 13 is stopped (ST06 and ST07). At this time, the bill is located between the pair of movable pieces 10A constituting the skew correction mechanism 10.

Next, the above-described driving source 70 is driven to allow the conveyor roller pair (14A and 14B) holding the bill therebetween to become apart from each other (ST08). At this time, the bill is in a state that no load is applied.

Figure 17:
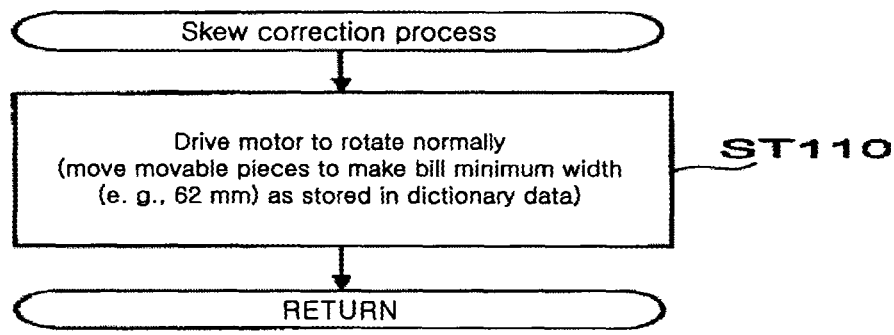
FIG. 17 shows a flowchart illustrating a skew correction operating process.

Then, a skew correction operating process is executed as the bill remains in this state (ST09). The skew correction operating process is conducted by driving the motor 40 for the skew correction mechanism to rotate normally to drive the pair of movable pieces 10A to get closer with each other. That is, in this skew correction operating process, as shown in the flowchart of FIG. 17, the motor 40 described above is driven to rotate normally to move the pair of movable pieces 10A in respective directions such that the pair of movable pieces 10A get closer with each other (ST110). The movement of the movable pieces is continued until the interval becomes the minimum width (example; width of 62 mm) of the bill registered in the reference data storage part in the control means, and the skew is corrected by the movable pieces 10A touching both sides of the bill such that the bill may be positioned at the accurate center position.

When the skew correction operating process as described above is completed, a traveling route opening process is subsequently executed (ST10). This process is conducted by moving the pair of movable pieces 10A in separating directions as the above-described motor 40 for the skew correction mechanism is driven to rotate reversely (refer to ST100 to ST102 of FIG. 16).

Next, the above-described driving source 70 is driven to move the upper conveyor roller 14A to contact the lower conveyor roller 14B, and the bill is nipped and held between the pair of conveyor rollers (14A and 14B) (ST11). Thereafter, the bill conveyor motor 13 is driven to rotate normally to carry the bill into the inside of the apparatus, and when the bill passes through the bill reading means 8, a bill reading process is executed (ST12 and ST13).

Figure 18:
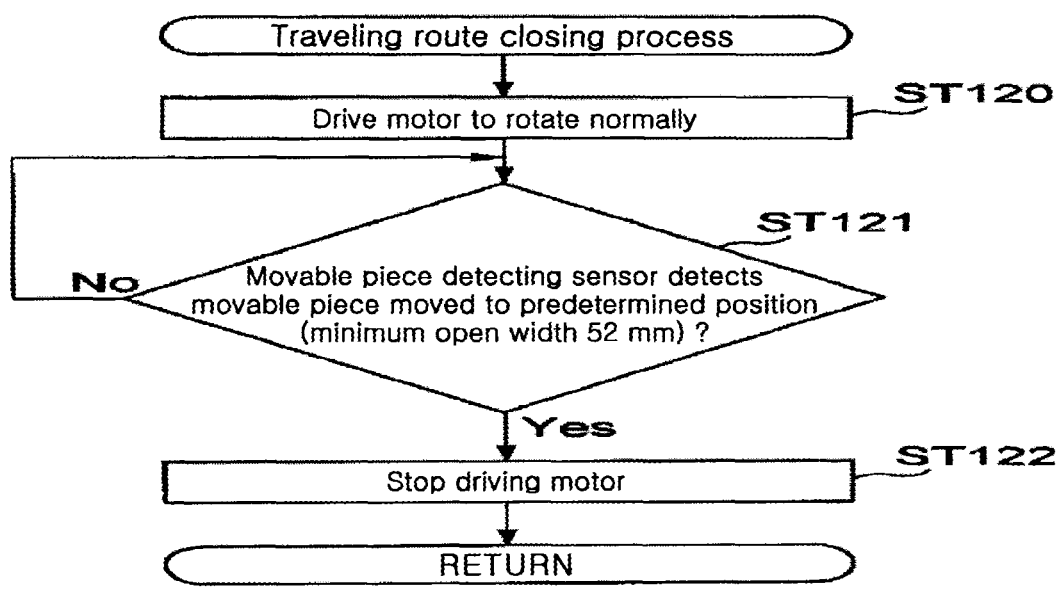
FIG. 18 shows a flowchart illustrating processing operations of a traveling route closing process.

Then, when the bill to be carried passes through the bill reading means 8, and the trailing end of the bill is detected by the movable piece detecting sensor 12 (ST14), a process for closing the bill traveling route 3 is executed (ST15). In this process, first, as shown in the flowchart of FIG. 18, after the trailing end of the bill is detected by the movable piece detecting sensor 12, the above-described motor 40 is driven to rotate normally to move the pair of movable pieces 10A in respective directions such that the pair of movable pieces 10A get closer with each other (ST120). Next, when it is sensed by the movable piece detecting sensor that the movable pieces 10A move to the predetermined positions (minimum open width positions: for example, width of 52 mm) (ST121), the driving operation of the normal rotation of the motor 40 is stopped (ST122).

With this traveling route closing process, the pair of movable pieces 10A are moved to the minimum open width positions (width of 52 mm) narrower than the width of any bill allowed to be inserted, thereby effectively preventing the bill from being drawn out. That is, by executing such a bill traveling route closing process, an opening distance between the movable pieces 10A is made shorter than the width of the inserted bill, thereby enabling the effective prevention of an action of drawing-out the bill in the direction toward the insertion slot by the operator for illicit purposes.

In addition, when the movable piece detecting sensor as described above detects the movement of the movable pieces 10A in this state, it may be considered that the operator is committing some fraudulent activities such that a predetermined processes may be executed. For example, a fraudulent manipulated signal (an anomaly sensed signal) may be transmitted to a higher-level apparatus that manages the operations of the bill processing apparatus, or an annunciator lamp may be provided on the bill processing apparatus, and this lamp may flash, or without activating a process for input acceptance (ST22) input by another operator thereafter, a process in which a discharge operation or the like is forcibly carried out may be executed. Or, appropriate processes such as canceling the operation of the bill processing apparatus (for example, a process for stopping the processing, a process for discharging the bill, and the like) and the like may be executed.

Further, in succession to the traveling route closing process described above (ST15), a conveyor roller pair spacing process is executed such that the driving source 70 is driven to make the conveyor roller pair (14A, 14B) having been in a state capable of nipping and holding the bill therebetween separate from each other (ST16). By executing the conveyor roller pair spacing process, even if the operator additionally inserts (double insertion) another bill by mistake, the bill is not subject to a feeding operation by the conveyor roller pair (14A, 14B) and hits front ends of the pair of movable pieces 10A in a closed state according to ST15 such that it is possible to reliably prevent the operation of bill double-insertion.

Along with the bill traveling route closing process as mentioned above, when the bill reading means 8 reads the data up to the trailing end of the bill, the bill conveyor motor 13 is driven for a predetermined amount and leave the bill stopped at a predetermined position (escrow position; position where the bill is carried toward the downstream by 13 mm from the center position of the bill reading means 8), and at this time, a bill authenticity judgment process is executed by the control means 200 (ST17 to ST20).

In the bill authenticity judgment process at ST20 as described above, when the bill is judged as a legitimate bill (ST21; Yes), an input from the operator is received (ST22) This input corresponds to an acceptance operation in which the operator presses an acceptance button in order to accept provision of services (for example, in the case of a gaming device, an acceptance process accompanied by start of a game), and a return operation in which the operator presses a return button in order to execute a process for returning the inserted bill.

Then, when an operation to accept the provision of various types of services is input (ST23; Yes), the bill conveyor motor 13 is consecutively driven to rotate normally to convey the bill in this state toward the bill housing part 100 (ST24). While the bill is conveyed, the bill conveyor motor 13 is driven to rotate normally until the trailing end of the bill is detected by the discharge detecting sensor 18, and after the trailing end of the bill is detected by the discharge detecting sensor 18 (ST25), the bill conveyor motor 13 is driven to rotate normally by the predetermined amount (ST26 and ST27).

The process for driving the bill conveyor motor 13 to rotate normally in ST26 and ST27 corresponds to a driving amount for which the bill is conveyed in the receiving port 103 of the bill housing part 100 from the discharge slot 3a on the downstream side of the bill traveling route 3 of the apparatus main body 2 so that the pair of belts 150 contact the surface on both sides of the conveyed-in bill to guide the bill stably to the press standby part 108. That is, by further driving the bill conveyor motor 13 to rotate normally for a predetermined amount after the trailing end of the bill is detected by the discharge detecting sensor 18, the pair of belts 150 contact the bill conveyed-in and are driven in the bill feeding direction so as to guide the bill in a stable state to the press standby part 108.

Then, after the above-described bill conveyor motor 13 is stopped, the process for driving the presser plate 115 is executed (ST28) such that the bill is placed on the placing plate 105.

Figure 19:
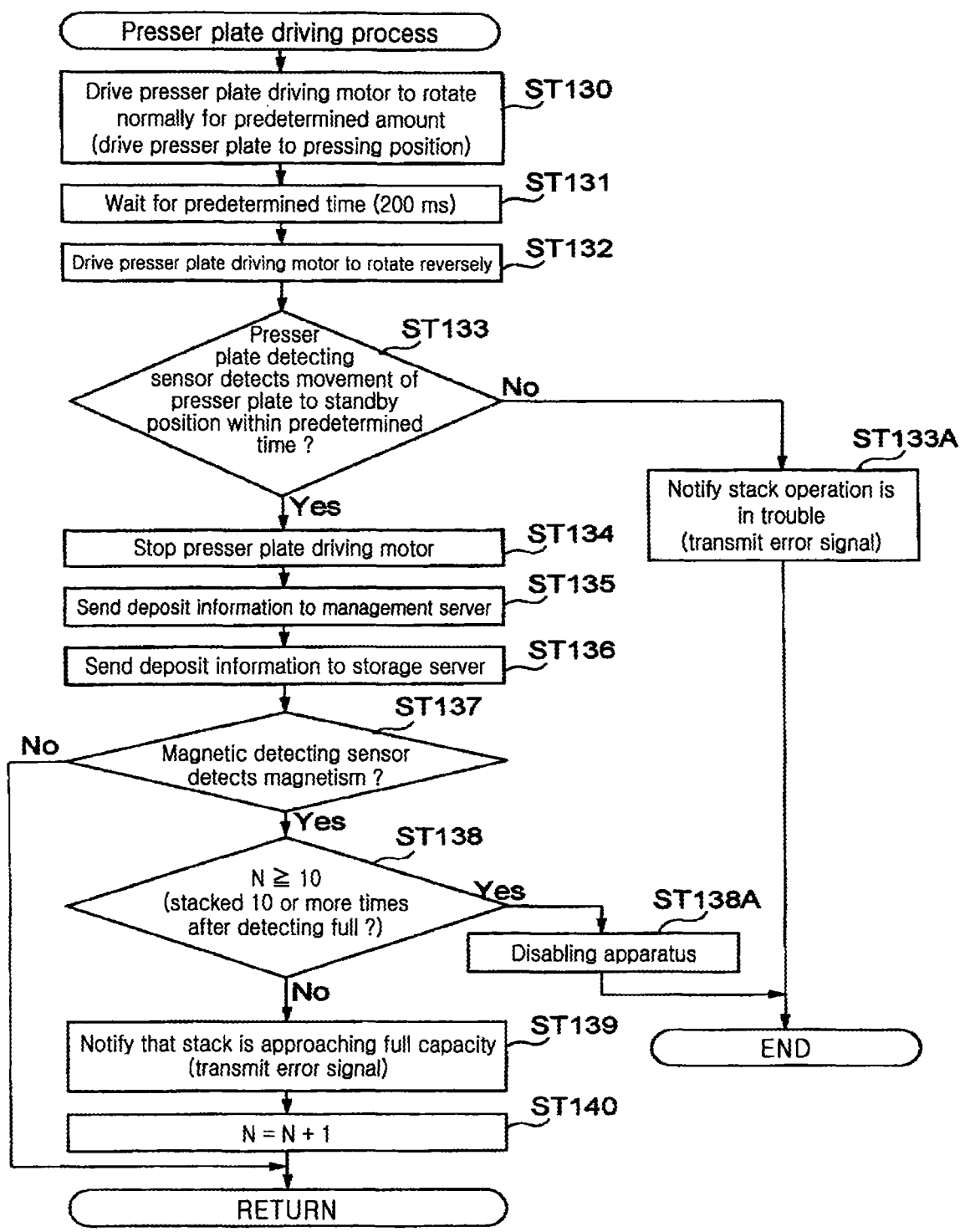
FIG. 19 shows a flowchart illustrating processing operations of a presser plate driving process.

The process for driving the presser plate 115 is executed in accordance with the flowchart as shown in FIG. 19. First, the driving motor 20 of the presser plate 115 is driven to rotate normally for a predetermine amount to move the presser plate 115 staying at the initial position in the above ST02 until it gets to the pressing position (ST130). With respect to the amount of driving to rotate normally the motor 20, if the motor 20 is composed of a DC motor, a predetermined amount of rotation can be set such that pulses are generated by utilizing, for example, an encoder and the number of the pulses is measured. That is, by driving the driving motor 20 to rotate normally for a predetermined amount, the presser plate 115 is moved from the initial position to the pressing position via the main body side gear train 21 and the presser plate driving mechanism 120 (the housing part side gear train 124, the rack formed on the movable member 122, and the link members 115a and 115b and so on).

According to the movement of the presser plate 115, the bill in the press standby part 108 passes through the opening 110A between the pair of regulatory members 110 so as to be deflected in a U-shape in a laterally symmetrical manner, and the bill is finally pressed onto the placing plate 105. In this case, since the bill is conveyed to the appropriate pressing position without leaning to either side by the pair of belts 150 as described above, even if the presser plate 115 is moved, the bill is placed on the placing plate 105 stably without jamming or the like between the presser plate 115 and the pair of regulatory members 110.

When the presser plate 115 is moved to the pressing position, the presser plate 115 is processed to wait (ST131) for a predetermined time (200 ms) at the pressing position so as to place the bill stably on the placing plate 105, and thereafter, the driving motor 20 of the presser plate 115 is driven to rotate reversely (ST132). Then, when it is detected by the presser plate detecting sensor 23 that the presser plate 115 has moved from the pressing position to the aforementioned standby position, the driving of the motor 20 is stopped, and the presser plate 115 is stopped in the standby position (ST133: Yes, ST134). As described above, the bill cannot be drawn out in this standby position.

In addition, if the presser plate detecting sensor 23 does not detect that the presser plate 115 has moved from the pressing position to the standby position within a predetermined period of time, it is considered that something is wrong with the stack operation, and the signal expressing that something is wrong with the stack operation (an error signal) is transmitted to an external device, annunciation means, or the like (ST133; No, ST133A).

As described above, when the presser plate 115 is stopped at the standby position, the CPU 210 subsequently sends the read monetary information of the bill along with the unique ID information assigned to the bill processing apparatus to the management server 260 (ST135). Therefore, the deposit information sent from each bill processing apparatus is thus recorded and managed successively by the management server 260.

Then, after sending the deposit information to the management server 260, the CPU 210 sends the deposit information to the reader/writer 142 (ST136), and the reader/writer 142 writes the deposit information into the storage means (ID tag) disposed on the bill housing part 100.

Then, after the presser plate 115 is moved from the pressing position to the standby position, in a case where the magnetic sensor 140 detects magnetism provided to the rear surface of the placing plate 105 (ST137; Yes), a detection signal is sent to the CPU 210 to inform that the number of bills stacked in the bill housing part 100 approaches the predetermined number (ST138; No, ST139).

In this embodiment, in designing a detection signal generation as a threshold value from the magnetic sensor 140, the magnetic sensor 140 is installed to generate the detection signal before the number of bills stacked on the placing plate 105 reaches the predetermined number (that is, the predetermined number less nine (9)) in consideration of safely and easy handling.

Concretely, when the magnetic sensor 140 begins to detect the magnetism emitted by the magnet 140a, the CPU 210 increments a count repeatedly at each subsequent bill housing operation (for each operation of housing a single bill) (ST140) and writes the information in the RAM 214. When the count is not exceeding nine (9), the CPU 210 causes a notification that the stacker is approaching a full state (ST139). This notification may specifically be comprised of a drive signal to be sent to the notification means configured with a speaker that notifies such a state by sound, a lamp that notifies the state visually, and so on to make the administrator and the like notified that the stacker is approaching a full state by means of the sound, lamp, and so on. With this notification, the administrator can exchange the bill housing parts 100 before the number of bills in the bill housing part 100 reaches the predetermined number.

Otherwise, the CPU 210 may be configured to send an error signal to the management server 260 (see FIG. 10) that manages the operations of bill processing apparatuses (gaming machine) to enable the state to be grasped in the other location. By this configuration, the timing for removing the bill housing part 100 can be managed appropriately.

Further, after the magnetic sensor 140 detects the magnetism, when it is detected that ten (10) or more times the bill stack operation is repeated without exchanging the bill housing part 100 (ST138; Yes), a process of disabling the apparatus is executed in order for bills not to be further inserted therein (ST138A) With respect to this disabling process, for example, a process of stopping the bill conveyor motor 13 driving the bill conveyance mechanism 6 described above may be performed in order not to convey the bill inside even if a user inserts a bill into the bill insertion slot. In this way, because no more bills beyond the predetermined number of bills are thus prevented from being conveyed into the bill housing part 100, it is possible to prevent components of the bill housing part 100 from breaking down.

Also, in the process of ST21 as described above, when the inserted bill is judged as a non-legitimate bill or the operator presses the return button (ST23; No), a traveling route opening process is executed (ST51, refer to ST100 to ST102 of FIG. 16), then, the bill conveyor motor 13 is driven to rotate reversely, and the conveyor roller pair (14A, 14B) are brought into contact with each other such that the bill waiting at the escrow position is conveyed toward the bill insertion slot 5 (ST52 and ST53). Then, when the insertion detecting sensor 7 senses the trailing end of the bill to be returned toward the bill insertion slot 5, the driving to reversely rotate the bill conveyor motor 13 is stopped, and above-described driving source 70 is driven to make the conveyor roller pair (14A and 14B) having been in a state of nipping and holding the bill therebetween separate from each other (ST54 to ST56). Then, the traveling route closing process is executed (AT57), the motor 20 for driving the presser plate 115 is driven to rotate forward for a predetermined amount to return the presser plate, which had been moved to the initial position in ST02, to the standby position (ST58), and the series of processes have been completed.

As mentioned above, the embodiment of the present invention is described. However, the present invention is not limited to the above-described embodiments, and various modifications of the present invention can be implemented.

In the present invention, it suffices that a transmitting part (reader/writer) which wirelessly sends information of a bill inserted from a bill insertion slot is installed onto an apparatus main body side, and that an antenna wirelessly receiving the information sent from the transmitting part and a storage part storing the bill information received from the antenna are disposed on a bill housing part side, and the other components of the apparatus such as a driving source for driving the various kinds of driving members as mentioned above or a power transmission mechanism from the driving source may be modified as appropriate. The transmitting part and the antenna receiving the information sent from the transmitting part may be modified as appropriate with respect to the configuration and the arranged positions.

According to the above-described embodiment of the paper sheet processing apparatus, the information of the paper sheet housed in the housing part after having been inserted from the insertion slot is sent and received between the transmitting part and the antenna by wireless transmission such that it is not necessary to install connection terminals or a power and signal line in the apparatus, whereby an electrical contact failure of the connection terminals between them would not occur.

Further, the housing part according to the above-described embodiment comprises a placing plate on which the paper sheets are placed, a spring which pushes the placing plate, and an opening/closing door from which the paper sheets housed on the placing plate are taken out, wherein the storage part is installed at an opposite position to the opening/closing door with the spring being interposed inbetween.

For example, even if it is attempted to replace the legitimate storage part with another storage part storing illegitimate information by opening the opening/closing door, such a fraudulent activity can be prevented effectively because the spring is interposed between the opening/closing door and the storage part.

Further, the housing part of the above-mentioned embodiment is configured to be mountable to and demountable from a frame constituting the apparatus main body, the antenna is installed on a surface side along an mounting/demounting direction of the housing part, and the transmitting part is installed on an opposing surface side of the frame opposite to the surface side of the housing part.

Even if the mounting of the housing part onto the frame of the apparatus main body is incomplete, for example, a distance between the transmitting part installed on the frame side and the antenna installed on the housing part side can be maintained within a distance enabling communications, a risk of communications failure between both components can be reduced.

As described so far, a paper sheet processing apparatus being capable of reliably providing information concerning the paper sheet to a housing body side can be provided.

The present invention can be incorporated into various types of apparatuses to provide products and services by inserting a bill thereinto, for example. It is also possible to apply it to a processing device to process a paper sheet such as a coupon ticket, not limited to, but including the bill.

What is claimed is:

1. A paper sheet processing apparatus comprising:
a stand;
a main body disposed on the stand and including
a paper sheet insertion slot formed in a front side of the main body,
and
a paper sheet conveyance mechanism that conveys a paper sheet inserted from the paper sheet insertion slot;
a magnetic sensing unit comprising a plurality of magnetic sensors;
a controller; and
a housing that stores the paper sheet conveyed by the paper sheet conveyance mechanism, the housing slidably mountable to the stand and demountable from the stand along a sliding direction, the housing including a placing plate on which the paper sheet is to be stacked and a spring that pushes the placing plate,
wherein the paper sheet conveyance mechanism conveys the paper sheet to a feed port of the housing by discharging the paper sheet along a paper sheet traveling route that is extended from the paper sheet insertion slot toward inside of the main body and is formed to be bent at a back side of the main body so as to be inclined downward,
wherein the apparatus further comprises:
a reader that reads information on a paper sheet inserted into the paper sheet insertion slot, the reader disposed on the main body;
a transmitter that sends the information read by the reader, the transmitter disposed on a lower surface side of the main body,
wherein the housing comprises an antenna that receives the information wirelessly from the transmitter, is installed on an upper wall of the housing, and has a surface substantially parallel to the upper wall and facing the transmitter; and
wherein the transmitter has a first surface substantially parallel to the surface of the antenna and a second surface substantially perpendicular to the surface of the antenna, the first surface broader than the second surface,
wherein the stand is frame-shaped by being surrounded by a pair of side plates facing each other, a bottom plate, and a back plate, the bottom plate and the back plate are sandwiched by the pair of side plates, and the housing is inserted into the frame of the stand so that the housing and the stand pass each other, and
wherein when the housing is completely mounted on the stand, an outer periphery of the housing is held by the side plates, the back plate and the bottom plate of the stand so that a positional relationship of the transmitter and the antenna is defined to allow the antenna to receive the information from the transmitter,
wherein the main body comprises a wall,
wherein the first surface of the transmitter is disposed on the wall of the main body,
wherein the upper wall of the housing is substantially parallel to a ceiling plate of the stand during the sliding of the housing into the stand such that the first surface of the transmitter and the surface of the antenna are substantially parallel to each other,
wherein the upper wall of the housing is spaced apart from the ceiling plate of the stand and the first surface of the transmitter partly faces the surface of the antenna such that a distance between the transmitter and the antenna is maintained to allow a communication between the transmitter and the antenna to be performed when the housing is incompletely mounted to the stand by the sliding,
wherein when the housing is incompletely mounted, a lower wall of the housing is partly overlapped with the bottom plate of the stand, and
wherein each of the plurality of magnetic sensors are disposed at different respective predetermined positions along the pushing direction of the spring, each of the plurality of magnetic sensors detecting a magnetic field when the placing plate reaches each respective predetermined position, wherein the controller:
transmits the information stored in the storage to a server;
counts a number of paper sheets that are stacked in the housing after a respective magnetic sensor detects the magnetic field,
informs to an external device that the housing is approaching a full state after a respective magnetic sensor detects the magnetic field and before the counted number exceeds a first threshold, and
stops storing the paper sheet into the housing when the counted number reaches a second threshold greater than the first threshold.

2. The apparatus of claim 1, further comprising:
a validator that determines validity of the paper sheet inserted from the paper sheet insertion slot; and
wherein the controller:
determines whether an input is received when the paper sheet is determined to be valid by the validator; and
transmits paper-sheet-reception information to the storage and a higher-rank device after the paper sheet is received in the housing.

3. The apparatus of claim 2, wherein the controller:
detects whether the housing is full after transmitting the paper-sheet-reception information; and
generates a detection signal when the housing is detected to be full.

4. The apparatus of claim 1, wherein the server records and manages the information from the controller.

5. The apparatus of claim 1, wherein the information comprises a value and a time of stack of each stacked paper sheet and an ID of the apparatus.

6. The apparatus of claim 1, wherein the magnetic sensing unit generates detection signals, and
wherein the controller determines a number of paper sheets stacked on the housing based on the detection signals.

7. The apparatus of claim 1,
wherein the housing further comprises a storage that stores the information of the paper sheet received through the antenna,
wherein the apparatus further comprises a magnet disposed on the placing plate, which generates the magnetic field;
wherein the plurality of magnetic sensors are disposed on the main body and receive the magnetic field; and
wherein the controller:
starts counting a number of paper sheets that are stacked in the housing after one of the plurality of the magnetic sensors receives the magnetic field, and
stops storing the paper sheet into the housing when the counted number is ten or more, and
wherein the surface of the antenna includes a loop surface such that a communication direction of the antenna is perpendicular to the loop surface,
wherein the first surface of the transmitter and the loop surface of the antenna are located substantially parallel to a direction of the movement of the housing when mounting and demounting,
wherein the loop surface is positioned such that the antenna receives the information from the transmitter even when the housing is not located at a predetermined position after the housing is mounted on the frame,
wherein the loop surface of the antenna and the first surface of the transmitter entirely overlap each other when the housing is located at the predetermined position, and
wherein the upper wall of the housing entirely overlaps the first surface of the transmitter when the housing is at the predetermined position.

8. The apparatus of claim 1, wherein the housing further comprises:
a storage that stores the information of the paper sheet received through the antenna;
a presser plate; and
a pair of regulatory members disposed on both sides of the placing plate;
wherein the controller:
starts counting a number of paper sheets that are stacked in the housing after at least one of the plurality of magnetic sensors detects the magnetic field, and
stops storing the paper sheet into the housing when the counted number is a predetermined number or more, and
wherein the surface of the antenna includes a loop surface such that a communication direction of the antenna is perpendicular to the loop surface.

9. The apparatus of claim 8, wherein the first surface of the transmitter and the loop surface of the antenna are located substantially parallel to a direction of the movement of the housing when mounting and demounting,
wherein the loop surface is positioned such that the antenna receives the information from the transmitter even when the housing is not located at a predetermined position after the housing is mounted on the frame,
wherein the loop surface of the antenna and the first surface of the transmitter entirely overlap each other when the housing is located at the predetermined position, and
wherein the upper wall of the housing entirely overlaps the first surface of the transmitter when the housing is at the predetermined position.

10. The apparatus of claim 8, wherein the predetermined number is ten.

11. The apparatus of claim 8, further comprising a validator that determines validity of the paper sheet inserted from the paper sheet insertion slot,
wherein the controller:
determines whether an input is received when the paper sheet is determined to be valid by the validator;
drives the paper sheet conveyance mechanism to convey the paper sheet to the housing when it is determined that the input is received; and
transmits paper-sheet-reception information to the storage and a higher-rank device after the paper sheet is received in the housing.

12. The apparatus of claim 11, wherein the controller:
detects whether the housing is full after transmitting the paper-sheet-reception information; and
generates a detection signal when the housing is detected to be full.

13. The apparatus of claim 8, wherein the controller generates a notification that the housing is approaching a full state.

14. The apparatus of claim 8, wherein the controller generates a notification that the housing is approaching a full state when the counted number is less than the predetermined number.

15. The apparatus of claim 1, the magnetic sensing unit generates a detection signal when detecting that a number of paper sheets stacked in the housing reaches a first predetermined number being less than a second predetermined number corresponding to a full state of the housing; and
the controller:
starts counting the number of paper sheets that are stacked in the housing after the magnetic sensing unit generates the detection signal;
repeatedly transmits a notification that the housing is approaching the full state each time the controller counts the number of paper sheets; and
stops storing the paper sheet into the housing when the counted number reaches the second predetermined number.

16. The apparatus of claim 15, wherein the magnetic sensing unit comprises a plurality of magnetic sensors that are installed at a plurality of locations along the sliding direction.

* * * * *